US010050401B2

United States Patent
Katou et al.

(10) Patent No.: US 10,050,401 B2
(45) Date of Patent: Aug. 14, 2018

(54) TERMINAL INSERTION DEVICE AND TERMINAL INSERTION METHOD

(71) Applicant: Yazaki Corporation, Tokyo (JP)

(72) Inventors: Sanae Katou, Makinohara (JP); Kazuhiko Takada, Makinohara (JP); Hiroshi Furuya, Makinohara (JP); Hiroyuki Katayama, Makinohara (JP); Nobuto Tsukiji, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 283 days.

(21) Appl. No.: 14/935,980

(22) Filed: Nov. 9, 2015

(65) Prior Publication Data

US 2016/0064888 A1 Mar. 3, 2016

Related U.S. Application Data

(63) Continuation of application No. PCT/JP2014/061708, filed on Apr. 25, 2014.

(30) Foreign Application Priority Data

May 10, 2013 (JP) ................................ 2013-100760

(51) Int. Cl.
*H01R 43/20* (2006.01)
*G01B 11/00* (2006.01)
*G01B 11/24* (2006.01)

(52) U.S. Cl.
CPC ............ *H01R 43/20* (2013.01); *G01B 11/002* (2013.01); *G01B 11/2433* (2013.01); *Y10T 29/49174* (2015.01); *Y10T 29/53213* (2015.01)

(58) Field of Classification Search
CPC ......... Y10T 29/49139; Y10T 29/49147; Y10T 29/49169; Y10T 29/49174;
(Continued)

(56) References Cited

U.S. PATENT DOCUMENTS 4,936,011 A * 6/1990 Berry ..................... H01R 43/20
29/748
5,459,924 A * 10/1995 Ohsumi ................. H01R 43/20
29/33 F
(Continued)

FOREIGN PATENT DOCUMENTS

JP 07-296939 A 11/1995
JP 08-138826 A 5/1996
(Continued)

OTHER PUBLICATIONS

Office Action dated Nov. 14, 2016 issued by the State Intellectual Property Office in counterpart Chinese Patent Application No. 201480026676.6.
(Continued)

*Primary Examiner* — Peter DungBa Vo
*Assistant Examiner* — Joshua D Anderson
(74) *Attorney, Agent, or Firm* — Sughrue Mion, PLLC

(57) ABSTRACT

A terminal insertion device that inserts a terminal into a connector housing, is provided with a stationary disk, a parallel joint mechanism which grasps an electric wire which is connected to the terminal at a leading end and conveys the electric wire and inserts the terminal into a cavity of the connector housing, a biaxial sensor portion capable of measuring at least a contour position of the terminal, roll angle calculation portion which calculates a roll angle with respect to a reference condition, and a roll angle compensation control portion that controls the parallel joint mechanism to compensate an inclination of the terminal.

6 Claims, 21 Drawing Sheets

(58) Field of Classification Search
CPC .......... Y10T 29/49945; Y10T 29/5187; Y10T 29/53074; Y10T 29/53209; Y10T 29/53213; Y10T 29/53235; Y10T 29/53239; Y10T 29/53417; Y10T 29/53426; Y10T 29/53548; Y10T 29/53978; H01R 43/20; H01R 43/205; H01R 43/28
See application file for complete search history.

(56) References Cited

U.S. PATENT DOCUMENTS

| | | | | |
|---|---|---|---|---|
| 5,519,937 | A | * | 5/1996 | Soriano .................. B23P 19/12 29/709 |
| 5,655,293 | A | * | 8/1997 | Celoudoux ............ H01R 43/28 29/33 M |
| 5,727,312 | A | | 3/1998 | Maejima et al. |
| 6,038,763 | A | * | 3/2000 | Kodera ................ H01R 43/052 29/743 |
| 8,286,346 | B2 | * | 10/2012 | Furuya .................. H01R 43/20 29/33 M |
| 2003/0066190 | A1 | * | 4/2003 | Revel ..................... H01R 43/20 29/857 |
| 2013/0250309 | A1 | | 9/2013 | Takada |

FOREIGN PATENT DOCUMENTS

| | | |
|---|---|---|
| JP | 09-014919 A | 1/1997 |
| JP | 09-134772 A | 5/1997 |
| JP | 2001-160472 A | 6/2001 |
| JP | 2001-184958 A | 7/2001 |
| JP | 2012-103099 A | 5/2012 |

OTHER PUBLICATIONS

Search Report dated Jul. 29, 2014, issued by the International Searching Authority in counterpart International Application No. PCT/JP2014/061708 (PCT/ISA/210).

Written Opinion dated Jul. 29, 2014, issued by the International Searching Authority in counterpart International Application No. PCT/JP2014/061708 (PCT/ISA/237).

Translation of Written Opinion dated Jul. 29, 2014, issued by the International Searching Authority in counterpart International Patent Application No. PCT/JP2014/061708 (PCT/ISA/237).

* cited by examiner

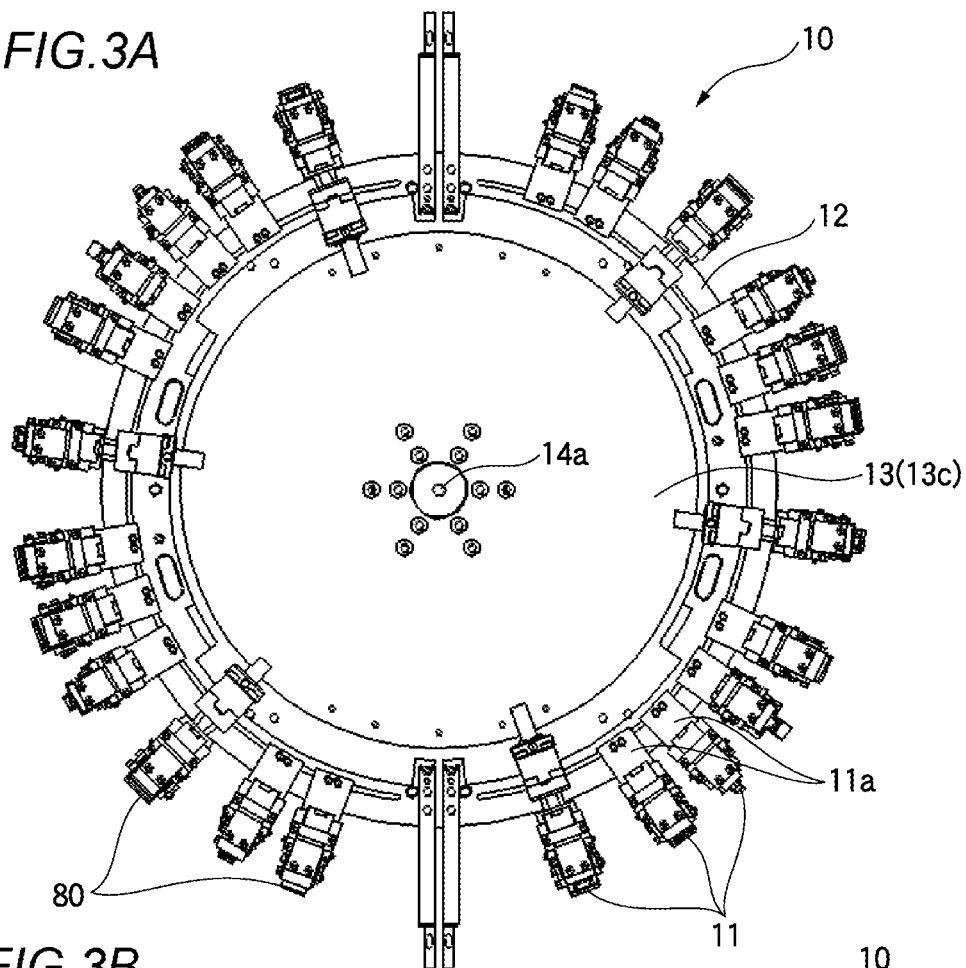
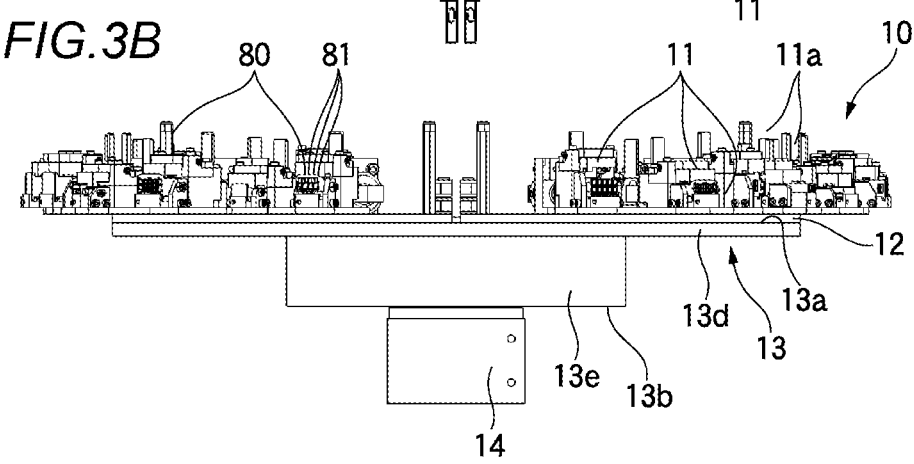

(C)

TERMINAL INSERTION DEVICE AND TERMINAL INSERTION METHOD

CROSS REFERENCE TO RELATED APPLICATIONS

This application is a continuation of PCT application No. PCT/JP2014/061708, which was filed on Apr. 25, 2014 based on Japanese Patent Application (No. 2013-100760) filed on May 10, 2013, the contents of which are incorporated herein by reference.

TECHNICAL FIELD

The present invention relates to a terminal insertion device and a terminal insertion method for inserting a terminal into a connector housing.

BACKGROUND ART

Patent Document 1 describes an automatic terminal insertion machine in which electric wires chucked by a terminal insertion head and lifted from a clamp rod are caught one by one and the terminals thereof are inserted into predetermined terminal accommodation chambers of connector housings placed being positioned on a mount.

Moreover, Patent Document 2 describes a terminal insertion device that inserts the terminal of a terminal with an electric wire into a terminal accommodation chamber of a connector housing in a manufacturing line of a wire harness or the like.

Moreover, a technology usable for automating the terminal insertion work or the like is disclosed, for example, in Patent Document 3 and Patent Document 4. That is, Patent Document 3 describes a method of measuring a position shift or the like by using a camera provided on the terminal insertion head. Moreover, Patent Document 4 describes a component position measurement method capable of accurately recognizing the position of the leading end of a component.

PRIOR ART DOCUMENTS

Patent Documents

[Patent Document 1] JPA Publication No. 2001-160472
[Patent Document 2] JPA Publication No. 2001-184958
[Patent Document 3] JPA Publication No. Hei 9-14919
[Patent Document 4] JPA Publication No. 2012-103099

SUMMARY OF THE INVENTION

Problem that the Invention is to Solve

The work process of inserting the terminals attached to electric wires into connector housings when a wire harness or the like is manufactured can be automated by using the technology of Patent Document 1 and Patent Document 2. Moreover, to reduce the occurrence of a terminal insertion error and the occurrence of a failure, the position measurement technology of Patent Document 3 and Patent Document 4 can be used.

However, the conventional technologies cannot sufficiently reduce the occurrence of a terminal insertion error or the occurrence of a failure. Further, a problem as shown next is present.

When an electric wire to which a terminal is attached is inserted into a terminal accommodation chamber of a connector housing, under present circumstances, it is necessary to grasp and position the terminal and grasp the electric wire at the same time, which makes heavy the insertion head of the mechanism performing the insertion work and increases the number of components. When the insertion head is heavy, the movement speed of the mechanism cannot be increased, so that the time required for the work cannot be reduced.

On the other hand, if only the electric wire part in a position slightly away from the terminal is grasped without the terminal being grasped by the insertion head and the terminal is inserted into the connector housing under this condition, since the electric wire part has flexibility, the area from the grasped part to the terminal at the leading end of the electric wire is sometimes inclined in the vertical and horizontal directions with respect to the axis in the insertion direction. Further, since the terminal is not grasped, there is a possibility that the insertion work is performed with the direction of the terminal being inclined in a direction circling around the axis in the insertion direction (roll direction).

Commonly used terminals are, in many cases, substantially rectangular in cross section, and the terminal accommodation chamber of the connector housing frequently has a shape slightly larger than the outer shape of the terminal. Therefore, if the terminal remains inclined in the roll direction, the possibility is high that the terminal cannot be inserted into the connector housing. In that case, the terminal buckles and the insertion ends in failure. Moreover, when the position of the terminal attached to the leading end of the electric wire is shifted in the vertical and horizontal directions because of an inclination of the electric wire, the insertion of the terminal also ends in failure since it is impossible to accurately position this terminal and the terminal accommodation chamber of the connector housing.

The present invention is made in view of the above-described circumstances, and an object thereof is to provide a terminal insertion device and a terminal insertion method where terminal insertion failure does not readily occur and the time required for the insertion work can be reduced.

Means for Solving the Problem

To attain the above-mentioned object, a terminal insertion device according to the present invention is characterized by the following (1) to (6):

(1) A terminal insertion device that inserts a terminal into a connector housing, comprising:
a stationary disk on which a plurality of connector housings are arranged;
a parallel joint mechanism which grasps an electric wire which is connected to the terminal at a leading end, conveys the electric wire toward any one of the connector housings arranged on the stationary disk, and inserts the terminal into a cavity of the connector housing;
a biaxial sensor portion capable of measuring at least a contour position of the terminal with respect to each of a direction of a first axis substantially orthogonal to an insertion direction of the terminal and a direction of a second axis orthogonal to the first axis;
a roll angle calculation portion which calculates a roll angle with respect to a reference condition in a direction circling around an axis in the insertion direction of the terminal based on a diagonal dimension in a rectangular cross-sectional shape of a leading end portion of the terminal and a width dimension of the terminal obtained by the measurement using the biaxial sensor portion; and a roll angle compensation control portion that controls the parallel joint mechanism to compensate an inclination of the terminal corresponding to the roll angle before the terminal is inserted into the cavity.

(2) The terminal insertion device according to the structure of the above (1), further comprising:

an electric wire inclination compensation control portion that controls the parallel joint mechanism so as to measure positional coordinates of the leading end portion of the terminal by using the biaxial sensor portion, detects an inclination of the electric wire in a pitch direction and a yaw direction based on a difference of the positional coordinates from reference coordinates and compensates the position of the leading end portion of the terminal according to the inclination before the terminal is inserted into the cavity.

(3) The terminal insertion device according to the structure of the above (2), further comprising:

an electric wire inclination rectification control portion that, after the roll angle compensation control portion completes the compensation of the inclination of the terminal and the electric wire inclination compensation control portion completes the compensation of the position of the leading end portion of the terminal, moves the terminal to a primary insertion position where the leading end portion of the terminal abuts on an entrance of the cavity into which the terminal is to be inserted, thereafter, moves a position where the electric wire is grasped, so as to rectify the inclination of the electric wire detected by the electric wire inclination compensation control portion, and then, inserts the terminal into the cavity to a secondary insertion position behind the primary insertion position.

(4) In the terminal insertion device according to any one of the structures of the above (1) to (3), wherein after executing the compensation of the inclination of the terminal in a specific rotation direction in a state that the rotation direction of the roll angle is unknown, the roll angle compensation control portion again measures the diagonal dimension of the terminal by using the biaxial sensor portion, and when it is detected from the measurement result that the roll angle has increased, compensates the inclination of the terminal with respect to a direction opposite to the specific rotation direction.

(5) In the terminal insertion device according to any one of the structures of the above (1) to (4), wherein the biaxial sensor portion is supported by a movable mechanism that is movable in directions approaching and separating from the terminal along an axis the same as the insertion direction of the terminal into the cavity.

(6) In the terminal insertion device according to any one of the structures of the above (1) to (5), wherein the parallel joint mechanism grasps a part of the electric wire in a state that the terminal is released.

According to the terminal insertion device of the structure of the above (1), it is possible to detect the inclination of the terminal in the roll direction before the terminal is inserted into the cavity and control the position of the terminal so that this inclination is compensated. Therefore, even in a state that only the electric wire supporting the terminal is grasped by the parallel joint mechanism and the terminal at the leading end of the electric wire is released, the position of the terminal can be accurately adjusted to the shape and position of the cavity of the connector housing. Moreover, since the parallel joint mechanism is used, even if the situation is such that inclination in the vertical and horizontal directions occurs from the grasped part toward the leading end of the electric wire, the position of the terminal can be adjusted with high accuracy.

According to the terminal insertion device of the structure of the above (2), even the situation is such that inclination in the vertical and horizontal directions occurs from the grasped part of the electric wire toward the leading end of the electric wire, it is possible to compensate the position shift in the terminal position at the leading end due to an inclination of the electric wire and accurately adjust the position of the terminal to the position of the cavity of the connector housing.

According to the terminal insertion device of the structure of the above (3), since the part grasping the electric wire moves toward the reference position while the leading end portion of the terminal remains abutting, in the primary insertion position, on the entrance of the cavity into which the terminal is to be inserted, an external force is applied between the part grasping the electric wire and the leading end of the terminal to rectify the inclination of the electric wire. If it is attempted to insert the terminal all the way into the cavity while the electric wire remains inclined in the yaw direction or in the pitch direction, the possibility is high that the terminal buckles and insertion fails; however, by rectifying the inclination of the electric wire before the terminal is inserted to the secondary insertion position, the electric wire becomes straightly extended along an axis coinciding with the insertion direction, so that the occurrence of buckling is prevented.

According to the terminal insertion device of the structure of the above (4), even in a case where only the contour shape and position of the terminal can be detected and the rotation direction of the roll angle is unknown as in the case where the biaxial sensor portion adopts a laser sensor, it is possible to properly compensate this roll angle and accurately adjust the position of the terminal to the shape and position of the cavity of the connector housing.

According to the terminal insertion device of the structure of the above (5), even if the positions of the terminal and the electric wire remain fixed, the biaxial sensor portion can be moved to a position where the terminal can be measured when necessary. Therefore, it is unnecessary to re-grasp the electric wire in association with the measurement of the terminal. If the re-grasping of the electric wire is not performed, no shift occurs between the measured position of the terminal and the actual position of the terminal.

According to the terminal insertion device of the structure of the above (6), since the parallel joint mechanism grasps only the electric wire, it is possible to reduce the number of components of the mechanism grasping the electric wire to reduce the weight. Thereby, the time required for the terminal insertion work can be reduced. Moreover, even in a case where only the electric wire is grasped, the insertion work can be performed after the inclination in the roll direction and the like that occur on the terminal are compensated, so that insertion failure never increases.

To attain the above-mentioned object, a terminal insertion method according to the present invention is characterized by the following (7) to (12):

(7) A terminal insertion method of inserting a terminal into a connector housing by a parallel joint mechanism, comprising:

a step of grasping an electric wire which is connected to the terminal at a leading end;

a step of conveying the electric wire toward any one of a plurality of connector housings arranged on a stationary disk;

a step of measuring at least a contour position of the terminal with respect to each of a direction of a first axis substantially orthogonal to an insertion direction of the terminal and a direction of a second axis orthogonal to the first axis;

a step of calculating a roll angle with respect to a reference condition in a direction circling around an axis in the insertion direction of the terminal based on a diagonal dimension in a rectangular cross-sectional shape of a leading end portion of the terminal and a width dimension of the terminal obtained by the measurement;

a step of controlling the parallel joint mechanism to compensate an inclination of the terminal corresponding to the roll angle before the terminal is inserted into the cavity; and a step of inserting the terminal into the cavity in the connector housing.

(8) The terminal insertion method of the structure of the above (7), further comprising:

a step of measuring positional coordinates of the leading end portion of the terminal;

a step of detecting an inclination of the electric wire in a pitch direction and a yaw direction based on a difference of the positional coordinates from reference coordinates; and a step of controlling the parallel joint mechanism so as to compensate the position of the leading end portion of the terminal according to the inclination before the terminal is inserted into the cavity.

(9) The terminal insertion method of the structure of the above (8), further comprising:

a step of, after the compensation of the inclination of the terminal is completed and the compensation of the position of the leading end portion of the terminal is completed, moving the terminal to a primary insertion position where the leading end portion of the terminal abuts on an entrance of the cavity into which the terminal is to be inserted;

a step of moving a position where the electric wire is grasped, so as to rectify the inclination of the electric wire; and a step of inserting the terminal into the cavity to a secondary insertion position behind the primary insertion position.

(10) The terminal insertion method of any one of the structures of the above (7) to (9), further comprising:

a step of compensating the inclination of the terminal in a specific rotation direction in a state that the rotation direction of the roll angle is unknown; and a step of again measuring the diagonal dimension of the terminal and when it is detected from the measurement result that the roll angle has increased, compensating the inclination of the terminal with respect to a direction opposite to the specific rotation direction.

(11) In the terminal insertion method of any one of the structures of the above (7) to (10), wherein in the step of measuring the contour position of the terminal, the biaxial sensor portion approaches or separates from the terminal along an axis the same as the insertion direction of the terminal into the cavity.

(12) In the terminal insertion method of any one of the structures of the above (7) to (11), wherein a part of the electric wire is grasped by the parallel joint mechanism in a state that the terminal is released.

According to the terminal insertion method of the structure of the above (7), it is possible to detect the inclination of the terminal in the roll direction before the terminal is inserted into the cavity and control the position of the terminal so that this inclination is compensated. Therefore, even in a state that only the electric wire supporting the terminal is grasped by the parallel joint mechanism and the terminal at the leading end of the electric wire is released, the position of the terminal can be accurately adjusted to the shape and position of the cavity of the connector housing.

According to the terminal insertion method of the structure of the above (8), even the situation is such that inclination in the vertical and horizontal directions occurs from the grasped part of the electric wire toward the leading end of the electric wire, it is possible to compensate the position shift in the terminal position at the leading end due to an inclination of the electric wire and accurately adjust the position of the terminal to the position of the cavity of the connector housing.

According to the terminal insertion method of the structure of the above (9), since the part grasping the electric wire moves toward the reference position while the leading end portion of the terminal remains abutting, in the primary insertion position, on the entrance of the cavity into which the terminal is to be inserted, an external force is applied between the part grasping the electric wire and the leading end of the terminal to rectify the inclination of the electric wire. If it is attempted to insert the terminal all the way into the cavity while the electric wire remains inclined in the yaw direction or in the pitch direction, the possibility is high that the terminal buckles and insertion fails; however, by rectifying the inclination of the electric wire before the terminal is inserted to the secondary insertion position, the electric wire becomes straightly extended along an axis coinciding with the insertion direction, so that the occurrence of buckling is prevented.

According to the terminal insertion method of the structure of the above (10), even in a case where only the contour shape and position of the terminal can be detected and the rotation direction of the roll angle is unknown as in the case where the biaxial sensor portion adopts a laser sensor, it is possible to properly compensate this roll angle and accurately adjust the position of the terminal to the shape and position of the cavity of the connector housing.

According to the terminal insertion method of the structure of the above (11), even if the positions of the terminal and the electric wire remain fixed, the biaxial sensor portion can be moved to a position where the terminal can be measured when necessary. Therefore, it is unnecessary to re-grasp the electric wire in connection with the measurement of the terminal. If the re-grasping of the electric wire is not performed, no shift occurs between the measured position of the terminal and the actual position of the terminal.

According to the terminal insertion method of the structure of the above (12), since the parallel joint mechanism grasps only the electric wire, it is possible to reduce the number of components of the mechanism grasping the electric wire to reduce the weight. Thereby, the time required for the terminal insertion work can be reduced. Moreover, even in a case where only the electric wire is grasped, the insertion work can be performed after the inclination in the roll direction and the like that occur on the terminal are compensated, so that insertion failure never increases.

Effects of the Invention

According to the terminal insertion device and the terminal insertion method of the present invention, terminal insertion failure does not readily occur, and the required time (cycle time) for the repetitively performed insertion work can be reduced.

The present invention has been briefly described above. Further, details of the present invention will be further clarified by reading through the mode for carrying out the invention (hereinafter, referred to as "embodiment") described below with reference to the attached drawings.

BRIEF DESCRIPTION OF THE DRAWINGS

FIG. 3A and FIG. 3B are views showing a stationary disk in the terminal insertion device of the embodiment of the present invention; FIG. 3A is a plan view of the stationary disk and FIG. 3B is a side view.

FIG. 14A shows a case where the roll direction rotation angle of the terminal is zero, FIG. 14B shows a case where the roll direction rotation angle of the terminal is θ, and FIG. 14C shows the rotation angle in the pitch direction and rotation angle in the yaw direction of an electric wire grasping main unit.

FIG. 20A is a perspective view of the stationary disk and FIG. 20B is an enlarged view of a relevant part of FIG. 20A.

MODE FOR CARRYING OUT THE INVENTION

A concrete embodiment related to the present invention will be described below with reference to the drawings.

[Outline of the Terminal Insertion Device]

Figure 1:
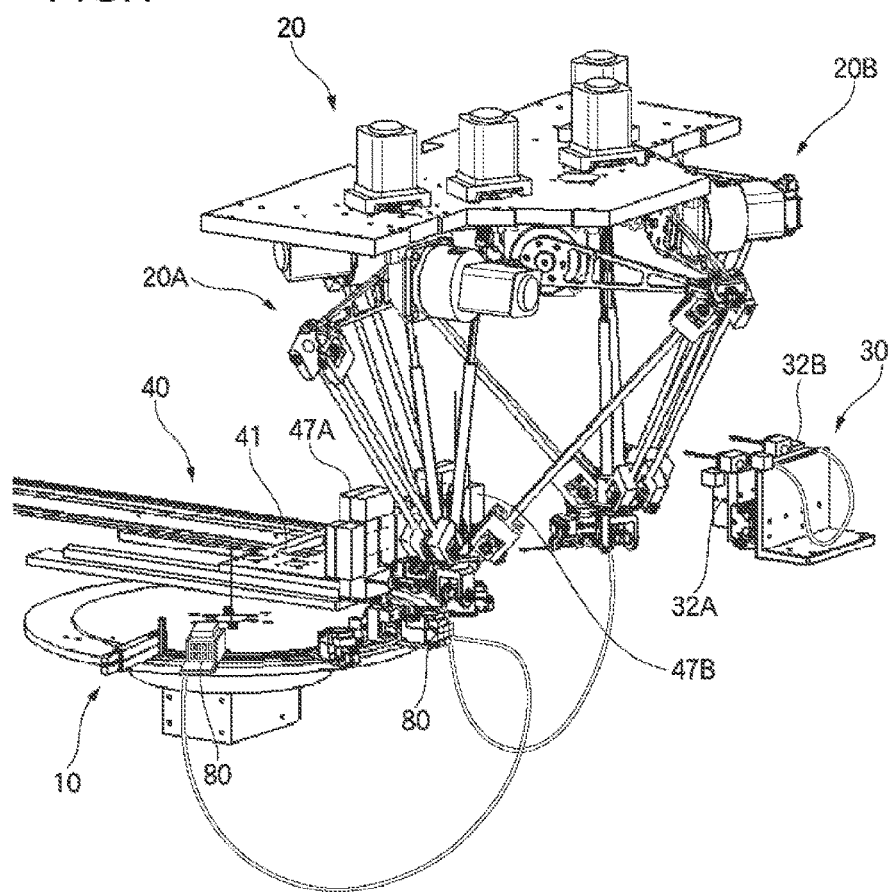
FIG. 1 is a perspective view of a terminal insertion device, of the embodiment of the present invention, provided with two parallel joint mechanisms.

FIG. 1 is a perspective view showing a terminal insertion device of the embodiment of the present invention. The terminal insertion device of the embodiment of the present invention includes a stationary disk 10 and a parallel joint mechanism 20. The terminal insertion device of the embodiment of the present invention is further provided with an electric wire conveyer 30 and a terminal measurement sensor 40. The stationary disk 10, the parallel joint mechanism 20, the electric wire conveyer 30 and the terminal measurement sensor 40 will be described below in detail.

As shown in FIG. 1, two parallel joint mechanisms 20A and 20B insert terminals into different connector housings 80 disposed on the stationary disk 10, respectively. Moreover, in the case of this structure, the electric wire conveyer 30 is provided with two mobile units 32A and 32B, the mobile unit 32A grasps one end of an electric wire 90, and the mobile unit 32B grasps the other end of the electric wire 90. Then, the two mobile units 32A and 32B convey the electric wire 90 having one end and the other end thereof being grasped to a predetermined position. As described above, the electric wire conveyer 30 conveys the electric wire in the unit of one circuit line. Moreover, in the terminal measurement sensor 40, two measurement sensors are attached to a sensor mount 41. The object to be measured by one measurement sensor 47A is the terminal situated at the leading end of the electric wire grasped by the parallel joint mechanism 20A, and the object to be measured by the other measurement sensor 47B is the terminal situated at the leading end of the electric wire grasped by the parallel joint mechanism 20B. With this structure, the two parallel joint mechanisms 20A and 20B one of which grasps one end of the electric wire 90 and the other of which grasps the other end of the electric wire 90 execute the terminal insertion processing on the different connector housings to which the end portions are to be connected, respectively.

Regarding the terminal insertion device of the embodiment of the present invention described below, to lead to a deeper understanding, a mode in which a terminal is inserted into a connector housing by one parallel joint mechanism 20 will be described; however, the terminal insertion processing is similar in a mode in which a terminal is inserted by the two parallel joint mechanisms 20A and 20B, since the two parallel joint mechanisms 20A and 20B are driven independently of each other.

[Structure of the Terminal Insertion Device]

[Details of the Stationary Disk 10]

Figure 2:
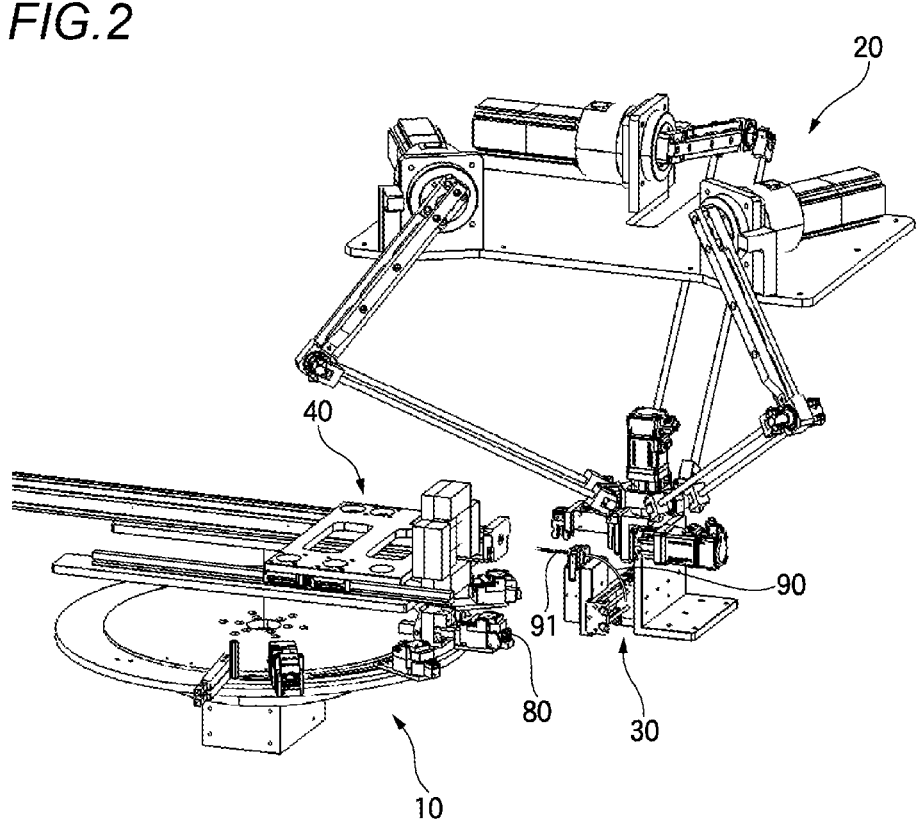
FIG. 2 is a perspective view showing the terminal insertion device of the embodiment of the present invention.

FIG. 3A and FIG. 3B are views showing the stationary disk in the terminal insertion device of the embodiment of the present invention; FIG. 3A shows a plan view of the stationary disk and FIG. 3B shows a side view thereof. The stationary disk 10 is, as shown in FIG. 2, FIG. 3A and FIG. 3B, a member for positioning the connector housing 80, and is attached to a flat surface of a housing support platform (not shown). The stationary disk 10 is provided with a housing cradle 11 holding the connector housing 80, a circular rail member 12 to which the housing cradle 11 is fixed, a disk member 13 where the rail member 12 is fixed to an upper surface 13a in such a manner as to coincide in axial center with the rail member 12, and a motor member 14 attached to a lower surface 13b of the disk member 13 and a rotation shaft 14a of which is set so as to coincide with the axial center of the disk member 13.

The housing cradle 11 has a concave portion where an inner surface substantially coinciding with the shape of the outer side surface of the connector housing 80 is formed. The connector housing 80 is positioned with respect to the housing cradle 11 by being accommodated in the concave portion of the housing cradle 11. The housing cradle 11 is fixed to the rail member 12 through a support platform 11a supporting the housing cradle 11. The support platform 11a fixed to the rail member 12 partly extends to the outside of the rail member 12 in the direction of the radius of the rail member 12. The housing cradle 11 is fixed to the part of the support platform 11a extending to the outside of the rail member 12. Moreover, a plurality of housing cradles 11 are fixed to the rail member 12, and these housing cradles 11 are arranged at predetermined intervals on the circular rail member 12. For this reason, the connector housings 80 fixed to the housing cradles 11 are arranged in such a manner that when the positions of the adjoining connector housings 80 are successively connected, the set of the connected line segments forma circle as a whole. Moreover, as shown in FIG. 3A and FIG. 3B, the connector housings 80 are held on the housing cradles 11 in such a manner that the front surfaces of the connector housings 80 where the openings of cavities 81 are exposed are situated outside the rail member 12. At this time, the cavities 81 of the connector housings 80 held on the housing cradles 11 are arranged in such a manner that the extension direction thereof is along the direction of the radius of the rail member 12.

The rail member 12 is a flat circular member where the inside of a circular flat plate is cut, and is fixed to the disk member 13 by the disk member 13 being partly fitted thereinside. The rail member 12 includes two semicircular flat plates juxtaposed on the same plane. Preferably, the rail member 12 with the connector housings 80 being held on the housing cradles 11 is fixed to the disk member 13 and the terminal insertion into each connector housing 80 is performed.

The disk member 13 is a member where three disk bodies 13c, 13d and 13e having different diameters are laminated in such a manner that the axial centers thereof coincide with one another and the disk bodies 13c, 13d and 13e are integrally formed. The diameter of the disk body 13c substantially coincides with the inner diameter of the rail member 12. By the disk body 13c being fitted in the rail member 12, the rail member 12 is fixed to the disk body 13c. Moreover, the diameter of the disk body 13d substantially coincides with the outer diameter of the rail member 12. The lower surface of the rail member 12 fixed to the disk body 13c is supported by the upper surface 13a of the disk body 13d, whereby the rail member 12 is stably held with respect to the disk member 13. Moreover, on the disk body 13e, the motor member 14 is attached to the lower surface 13b. The axial center of the disk body 13e coincides with the axial center of the rotation shaft 14a of the motor member 14, and the disk member 13 rotates with the rotation of the motor member 14. As a consequence, the rail member 12 fixed to the disk body 13c of the disk member 13 also rotates around the rotation shaft 14a with the rotation of the motor member 14. For this reason, the connector housings 80 fixed to the housing cradles 11, respectively, also rotate in the direction of the circumference of the circle formed by these housings.

The motor member 14 is supported on the flat surface of the housing support platform (not shown) in such a manner that the rotation shaft is vertical to the flat surface. By the motor member 14 being supported on the flat surface of the housing support platform, the stationary disk 10 is attached to the housing support platform. Regarding the motor member 14, the motor rotation force is transmitted to the disk member 13 through various gears, so that the disk member 13 rotates. The motor member 14 accepts a control signal from a control device (not shown in FIG. 2, FIG. 3A or FIG. 3B) and controls the motor rotation. The control of driving of the motor member 14 by the control device will be described in [Details of the control by the control device 70] shown later.

In the terminal insertion device of the embodiment of the present invention, a plurality of connector housings 80 are circularly arranged on the stationary disk 10. For this reason, in the terminal insertion device of the embodiment of the present invention, unlike in the conventional terminal insertion device, it is unnecessary to secure a space largely opened in the width direction to arrange the connector housings in a row, and it is necessary only to secure a space of a width enough to accommodate the stationary disk 10. For this reason, the above-described structure of the stationary disk 10 contributes to reduction in the size of the terminal insertion device.

[Details of the Parallel Joint Mechanism 20]

Figure 4:
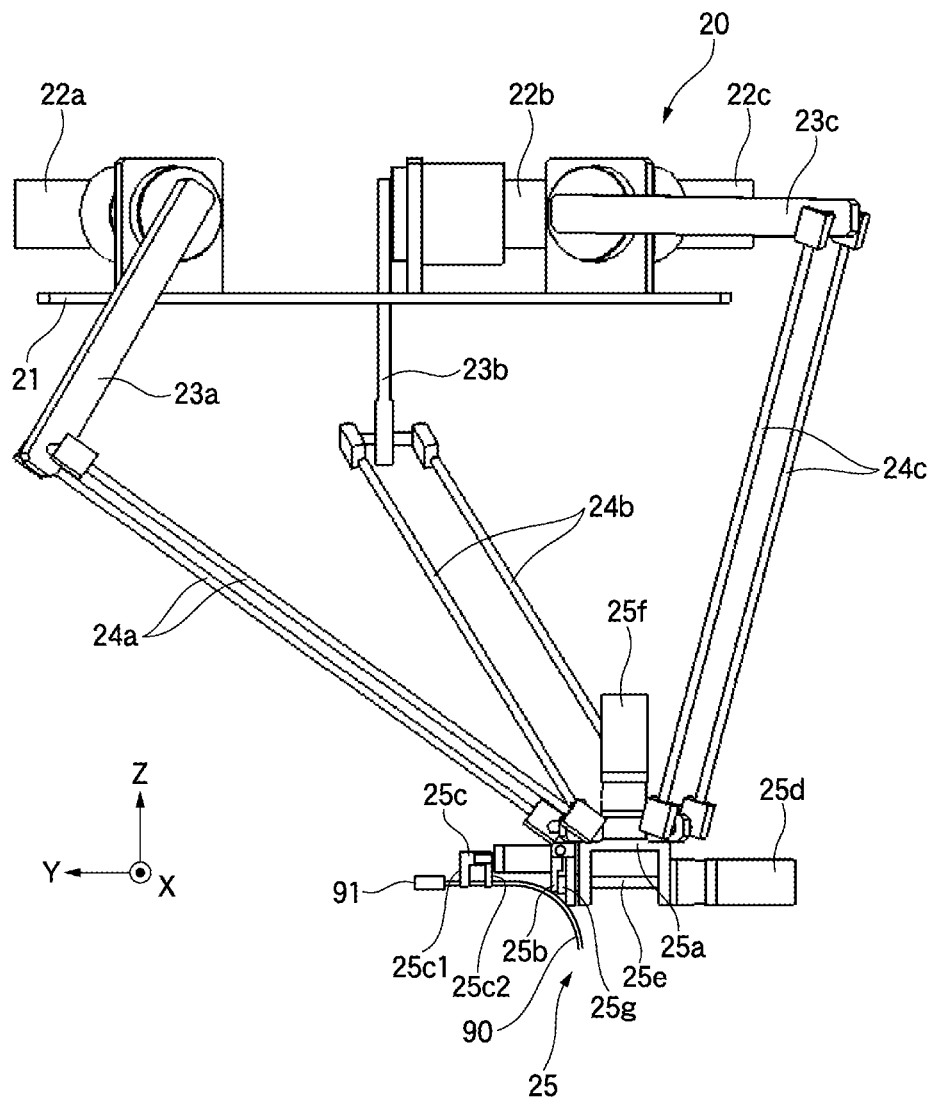
FIG. 4 is a side view showing the parallel joint mechanism in the terminal insertion device of the embodiment of the present invention.

FIG. 4 is a side view showing the parallel joint mechanism in the terminal insertion device of the embodiment of the present invention. The parallel joint mechanism 20 is apiece of equipment for inserting a terminal into the connector housing 80, and is attached to a parallel joint mechanism support platform (not shown). The parallel joint mechanism 20 is provided with, as shown in FIG. 4, a base 21 attached to the parallel joint mechanism support platform, three first motors 22a, 22b and 22c placed on the base 21, three arms 23a, 23b and 23c driven by one ends thereof being connected to the rotation shafts of the first motors 22a, 22b and 22c, respectively, three links 24a, 24b and 24c one ends of which are connected to the other ends of the first motors 22a, 23b and 23c, respectively, through a universal joint and a transmission gear, and a hand member 25 connected to the other ends of the three links 24a, 24b and 24c through a universal joint. In the parallel joint mechanism 20, the rotation amounts of the three first motors 22a, 22b and 22c are controlled to thereby change the inclination angles of the arms 23a, 23b and 23c and the angle of the links 24a, 24b and 24c to the arms 23a, 23b and 23c, whereby the hand member 25 can be translated in three directions along X, Y and Z. The parallel joint mechanism 20 accepts a control signal from the control device (not shown in FIG. 4) and controls the rotations of the first motors 22a, 22b and 22c. The control of driving of the translation of the parallel joint mechanism 20 in the three directions of X, Y and Z by the control device will be described in [Details of the control by the control device 70] shown later.

Further, the hand member 25 has a hand base 25a connected to the other ends of the three links 24a, 24b and 24c through a universal joint, an electric wire grasping main unit 25b attached to the hand base 25a in such a manner as to be revolvable in the roll direction, an electric wire chuck 25c provided at the leading end of the electric wire grasping main unit 25b and grasping a part of the electric wire including the terminal connected to the leading end, a second motor 25f attached to the hand base 25a and revolving the electric wire grasping main unit 25b in the pitch direction (the direction circling around the X axis in FIG. 4) and in the yaw direction (the direction circling around the Z axis in FIG. 4) with respect to the hand base 25a, a third motor 25d attached to the hand base 25a and revolving the electric wire grasping main unit 25b in the roll direction (the direction circling around the Y axis in FIG. 4) with respect to the hand base 25a, and a pressure sensor 25g that detects the external force acting on the electric wire chuck 25c. While the present embodiment adopts a structure in which the second motor 25f and the third motor 25d are provided on the hand base 25a, a structure may be adopted in which the second motor 25f and the third motor 25d are provided on the base 21. In this case, by adopting a structure in which the second motor 25f and the third motor 25d are attached to the hand base 25a through a telescopic shaft and a universal joint, the hand member 25 is revolvable in the pitch direction, in the yaw direction and in the roll direction. Moreover, while a structure is adopted in which the electric wire grasping main unit 25b is revolved in the pitch direction and the yaw direction by one second motor 25f, a structure may be adopted in which two motors corresponding to the second motor 25f are attached to the hand base 25a, one motor makes the electric wire grasping main unit 25b revolvable in the pitch direction by the rotation thereof and the other motor makes the electric wire grasping main unit 25b revolvable in the yaw direction by the rotation thereof.

The electric wire grasping main unit 25b has a cylinder that sends air to the electric wire chuck 25c, and the electric wire chuck 25c has its chuck closed when air is sent from the electric wire grasping main unit 25b and has its chuck opened when air becomes unsent. The parallel joint mechanism 20 accepts a control signal from the control device (not shown in FIG. 4) and controls the timing for the electric wire grasping main unit 25b to send air to the electric wire chuck 25c. The control of driving of the opening and closing of the electric wire chuck 25c by the control device will be described in [Details of the control by the control device 70] shown later.

Moreover, by driving the electric wire grasping main unit 25b while controlling the rotation amount of the second motor 25f, the position of the electric wire grasping main unit 25b revolves in the pitch direction and in the yaw direction. Moreover, the electric wire grasping main unit 25b has a drive shaft 25e coupled to the rotation shaft of the third motor 25d, and the position of the electric wire grasping main unit 25b can be revolved in the roll direction by rotating the drive shaft 25e with respect to the hand base 25a while controlling the rotation amount of the third motor 25d. As a consequence, the position of the electric wire grasped by the electric wire chuck 25c also revolves in the pitch direction, in the yaw direction and in the roll direction. The parallel joint mechanism 20 accepts a control signal from the control device (not shown in FIG. 4) and controls the rotation of the second motor 25f and the third motor 25d. The control of driving of the revolution of the electric wire grasping main unit 25b in the pitch direction, in the yaw direction and in the roll direction by the control device will be described in [Details of the control by the control device 70] shown later.

Moreover, the electric wire chuck 25c is provided with a front side chuck 25c1 and a rear side chuck 25c2. In the embodiment of the present invention, the chucks 25c1 and 25c2 are closed with the part of the outer sheath of the electric wire being sandwiched between the chucks, whereby the electric wire chuck 25c grasps the electric wire. When it becomes unnecessary for the electric wire chuck 25c to grasp a terminal 91 as described above, it becomes unnecessary to provide the electric wire grasping main unit 25b with a terminal chuck for grasping the terminal 91. This leads to reduction in the weight of the electric wire grasping main unit 25b, which leads to reduction in the weight of the hand member 25. As a consequence, improvement in the operation speed of the parallel joint mechanism 20 and reduction in cycle time can be realized, so that the work efficiency of the parallel joint mechanism 20 can be improved.

[Details of the Electric Wire Conveyer 30]

Figure 5:
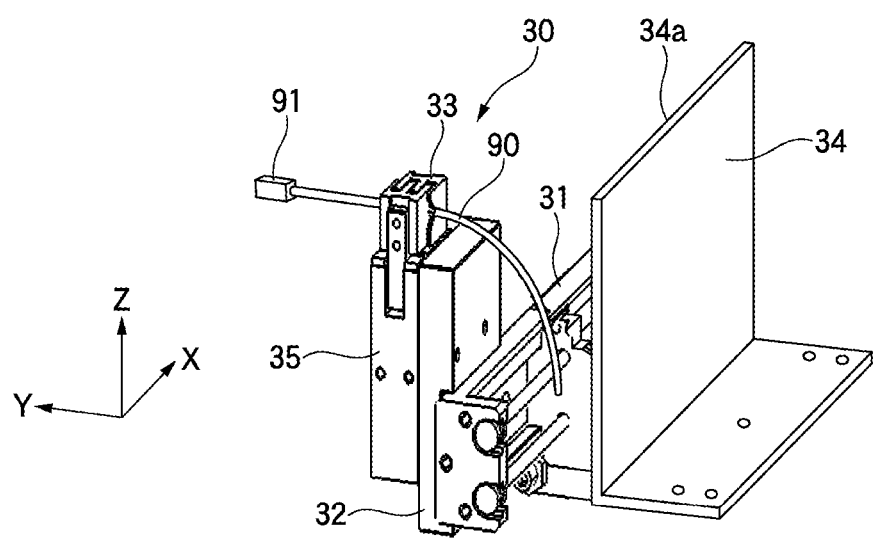
FIG. 5 is a perspective view showing the electric wire conveyer in the terminal insertion device of the embodiment of the present invention.

FIG. 5 is a perspective view showing the electric wire conveyer in the terminal insertion device of the embodiment of the present invention. The electric wire conveyer 30 is a piece of equipment that conveys the electric wire 90 having the terminal 91 attached to the leading end thereof to a predetermined position. The electric wire conveyer 30 is provided with, as shown in FIG. 5, a conveyance rail 31 extending in the X axis direction, a mobile unit 32 that is slidable on the conveyance rail 31, a conveyance chuck 33 provided on the mobile unit 32 and grasping a part of the electric wire 90 including the terminal 91 connected to the leading end, a frame 34, having an edge 34a, supporting the conveyance rail 31, and an air chuck main unit 35 that sends air to the conveyance chuck 33. In the embodiment of the present invention, the direction of the movement of the mobile unit 32 on the conveyance rail 31 corresponds to the direction of the X axis.

The mobile unit 32 is provided with a motor, and can slide on the conveyance rail 31 by the rotation force of the motor being converted into a propulsive force in the direction of the length of the conveyance rail 31. The mobile unit 32 accepts a control signal from the control device (not shown in FIG. 5) and controls the rotation of the motor. The control of driving of the sliding of the mobile unit 32 on the conveyance rail 31 by the control device will be described in [Details of the control by the control device 70] shown later.

Moreover, the mobile unit 32 has the air chuck main unit 35 that sends air to the conveyance chuck 33, and the conveyance chuck 33 has its chuck closed when air is sent from the mobile unit 32 and has its chuck opened when air becomes unsent. The mobile unit 32 accepts a control signal from the control device (not shown in FIG. 5) and controls the timing to send air to the conveyance chuck 33. The control of driving of the opening and closing of the conveyance chuck 33 by the control device will be described in [Details of the control by the control device 70] shown later.

The position where the electric wire 90 conveyed by the mobile unit 32 is grasped by the parallel joint mechanism 20 is prepositioned. That is, the mobile unit 32 moves on the conveyance rail 31 and stops at a predetermined prescribed position, whereas the parallel joint mechanism 20 moves toward the position on the premise that the electric wire conveyed by the mobile unit 32 is situated in a predetermined position. As a consequence, the parallel joint mechanism 20 can grasp the electric wire 90 conveyed by the mobile unit 32, whereas the mobile unit 32 releases its own grasp of the electric wire 90 after the electric wire 90 is grasped by the parallel joint mechanism 20. By this series of processing, the electric wire 90 is supplied to the parallel joint mechanism 20.

[Details of the Terminal Measurement Sensor 40]

Figure 6A:
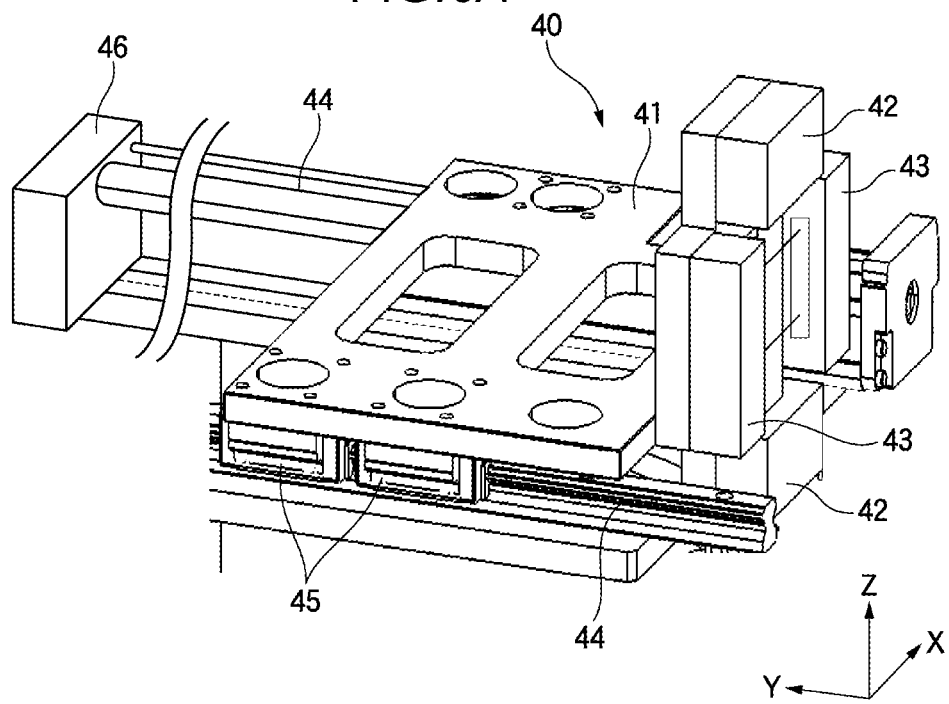
FIG. 6A is a perspective view showing a terminal measurement sensor in the terminal insertion device of the embodiment of the present invention.

FIG. 6A is a perspective view showing the terminal measurement sensor in the terminal insertion device of the embodiment of the present invention. The terminal measurement sensor 40 is a piece of equipment that measures the rotation angle, in the roll direction, of the terminal 91 situated at the leading end of the electric wire 90 grasped by the parallel joint mechanism 20 and the X and Z coordinates where the leading end of the terminal 91 is situated. In the embodiment of the present invention, the electric wire chuck 25c of the parallel joint mechanism 20 catches the part of the outer sheath of the electric wire 90 in two positions, and the parallel joint mechanism 20 conveys the electric wire 90 and inserts the terminal 91 into the cavity 81 of the connector housing 80. At this time, it should be considered that the terminal 91 is rotated in the roll direction. Further, the hanging down of the electric wire 90 due to the weight of the terminal 91 or the springback due to a curl of the electric wire, more specifically, the hanging down or the springback from the part grasped by the front side chuck 25c1 of the electric wire chuck 25c to the leading end of the electric wire 90 on the electric wire 90 should be considered. The terminal measurement sensor 40 detects the rotation angle of the terminal 91 in the roll direction and the inclination of the terminal 91 with respect to the Y axis direction due to the hanging down or the springback of the electric wire 90.

The terminal measurement sensor 40 is provided with a sensor mount 41, an X measurement sensor 42 that detects the position coordinates, in the X axis direction, of the leading end of the terminal 91 attached to the sensor mount 41, a Z measurement sensor 43 that detects the position coordinates, in the Z axis direction, of the leading end of the terminal 91 attached to the sensor mount 41, a sensor mount rail 44 extending in the Y axis direction, a slider 45 that enables the sensor mount 41 to slide along the sensor mount rail 44, and a drive source 46 for driving the sensor mount 41 forward and backward through the slider 45 which drive source 46 is provided at the end portion of the sensor mount rail 44 (the left side in FIG. 6A). The direction of the movement of the sensor mount 41 on the sensor mount rail 44 corresponds to the direction of the Y axis.

In the X measurement sensor 42, alight emitting surface that emits a belt-like laser and a light receiving surface that receives the belt-like laser are disposed in a state of being separated in the Z axis direction. Moreover, in the Z measurement sensor 43, the light emitting surface that emits a belt-like laser and a light receiving surface that receives the belt-like laser are disposed in a state of being separated in the X axis direction. When a shielding material is situated in the detection area surrounded by the light emitting surface and the light receiving surface of the X measurement sensor 42 and the light emitting surface and the light receiving surface of the Z measurement sensor 43 like the positional relationship between the area of detection by the measurement sensor and the terminal shown in FIG. 6B, the widths in the X direction and the Z direction and X and Z coordinates of the shielding member can be identified from the light intensity distribution detected at the light receiving surface of the X measurement sensor 42 and the light intensity distribution detected at the light receiving surface of the Z measurement sensor 43. If the leading end of the terminal 91 of the electric wire 90 grasped by the parallel joint mechanism 20 can be disposed in the detection area of the X measurement sensor 42 and the Z measurement sensor 43 by using this principle, the rotation angle θ in the roll direction and X and Z coordinates of the leading end of the terminal 91 can be detected from the widths in the X direction and the Z direction and X and Z coordinates of the terminal 91 detected by the X measurement sensor 42 and the Z measurement sensor 43.

Since the leading end of the terminal 91 is disposed in the detection area of the X measurement sensor 42 and the Z measurement sensor 43 as described above, the sensor mount 41 moves the sensor mount rail 44 in the Y axis direction as follows: The drive source 46 accepts a control signal from the control device (not shown in FIG. 6) to perform driving or stop driving, and the sensor mount 41 receives the driving force from the drive source 46 to move to a given position in the Y axis direction. By this movement of the sensor mount 41, the leading end of the terminal 91 can be within the detection area of the X measurement sensor 42 and the Z measurement sensor 43.

The farther the position where the parallel joint mechanism 20 grasps the electric wire 90 is from the terminal 91, the larger the amount of hanging down or the amount of springback of the electric wire 90 due to the weight of the terminal 91 is. As a consequence, it is considered that the terminal 91 is not within the detection area of the X measurement sensor 42 and the Z measurement sensor 43 or that the terminal 91 does not reach the detection area of the X measurement sensor 42 and the Z measurement sensor 43. For this reason, in determining the position where the parallel joint mechanism 20 grasps the electric wire 90, it is preferable that the maximum amount of displacement of the leading end of the terminal 91 in the X axis direction and in the Z axis direction due to the hanging down or the springback of the electric wire 90 be within the detection area and the maximum amount of displacement in the Y axis direction be within the range of the thickness (thickness in the Y axis direction) of the belt-like laser of the X measurement sensor 42 and the Z measurement sensor 43.

The movement of the sensor mount 41 described up to here is realized by the control device (not shown in FIG. 6) accepting a signal from an encoder of the drive source 46 and outputting a control signal to the drive source 46 to control the movement of the sensor mount 41. Then, when detecting the width in the X direction and the Z direction and X and Z coordinates of the leading end of the terminal 91 disposed in the detection area, the X measurement sensor 42 and the Z measurement sensor 43 output the signal to the control device. The method of calculating the rotation angle θ in the roll direction and X and Z coordinates of the leading end of the terminal 91 will be described in [Details of the control by the control device 70] shown later.

[Structure of the Control System]

Figure 7:
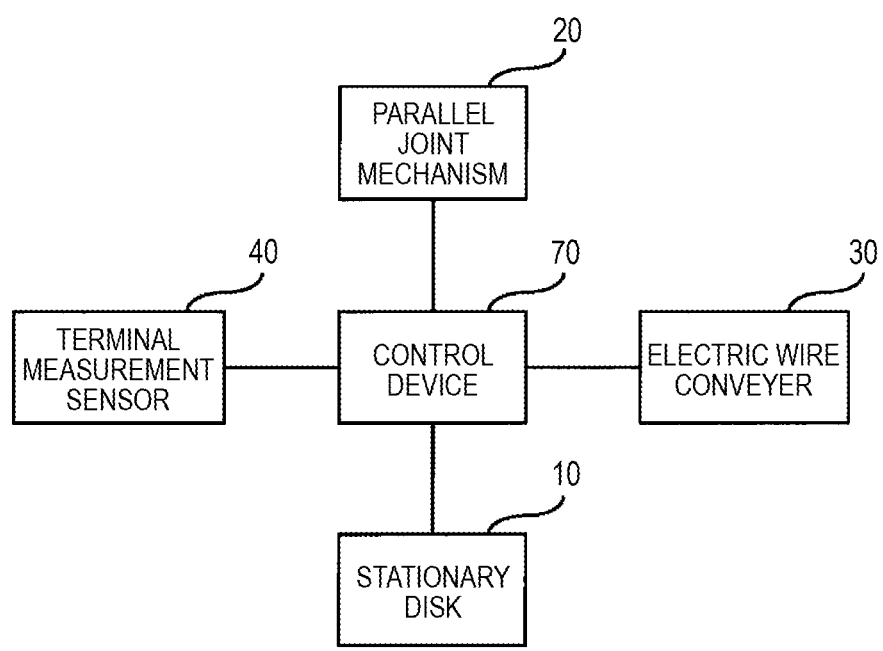
FIG. 7 is a functional block diagram of a control system including the terminal insertion device of the embodiment of the present invention.

As described in the section [Structure of the terminal insertion device], the terminal insertion device of the embodiment of the present invention is provided with the stationary disk 10 and the parallel joint mechanism 20, and is further provided with the electric wire conveyer 30 and the terminal measurement sensor 40. For centralized control of these pieces of equipment, the control system including the terminal insertion device of the embodiment of the present invention is provided with the control device 70. FIG. 7 is a functional block diagram of the control system including the terminal insertion device of the embodiment of the present invention. The control device 70 is connected to the motor member 14 of the stationary disk 10, the parallel joint mechanism 20, the mobile unit 32 of the electric wire conveyer 30, the X measurement sensor 42 and the Z measurement sensor 43 of the terminal measurement sensor 40, and the encoder of the drive source 46. The control device 70 outputs control signals to various driving sources, and receives from various sensors signals detected by the sensors. The control device 70 may be constituted by various devices such as a general-purpose computer or a dedicated arithmetic unit that controls the overall system including the terminal insertion device. Hereinafter, a series of processing for inserting the terminal 91 into the connector housing 80 which processing is controlled by the control device 70 will be described in detail.

[Details of the Control by the Control Device 70]

[Positioning Setting Processing]

In the control device 70, it is necessary to set the initial position of the stationary disk 10 and the initial position of the connector housing 80 disposed on the stationary disk 10 and make the control device 70 recognize the position of the cavity 81 of the connector housing 80 in the initial state prior to the series of processing for inserting the terminal 91 of the connector housing 80.

The disk member 13 and the motor member 14 of the stationary disk 10 are attached to a predetermined position of the housing support platform. For this reason, the position of the center of the rail member 12 attached to the disk member 13 the shape of which is identified can be set to one point on the axial center of the disk member 13. The radius of the rail member 12 and the position of attachment of each housing cradle 11 with respect to the rail member 12 are known. From the above, if the amount of relative shift between a predetermined position of the disk member 13 in the circumferential direction and a predetermined position of the rail member 12 in the circumferential direction when the rail member 12 is attached to the disk member 13 is found, the position of the connector housing 80 accommodated in each housing cradle 11 and the position of the opening of the cavity 81 can be set in the control device 70 based on the shift amount.

The amount of relative shift from the predetermined position of the disk member 13 in the circumferential direction to the predetermined position of the rail member 12 in the circumferential direction ca be set in the control device 70 as follows: Something that serves as a mark is provided in each of the predetermined position of the disk member 13 in the circumferential direction and the predetermined position of the rail member 12 in the circumferential direction, and the rail member 12 is attached to the disk member 13 in such a manner that those marks coincide with each other. When this is done, a shift amount "0" is set in the control device 70. Alternatively, a structure may also be adopted in which a scale representative of angles is added in the circumferential direction of the disk member 13 or in the circumferential direction of the rail member 12 and the angle from the predetermined position of the disk member 13 in the circumferential direction to the predetermined position of the rail member 12 in the circumferential direction is set as the shift amount in the control device 70.

Alternatively, the initial position of the disk member 13 may be set by using the parallel joint mechanism 20. For example, a round hole is provided to any one of the housing cradles 11 of the disk member 13, whereas the electric wire chuck 25c is made to hold a round bar for positioning instead of the electric wire 90. And the position of the housing cradle 11 where the round bar can be inserted into the round hole is set to a position where the rotation angle of the disk member 13 is 0. As described above, the initial position of the stationary disk 10 is set by various methods.

Moreover, prior to the series of processing for inserting the terminal 91 into the connector housing 80, it is necessary to set, in the control device 70, the initial position of the X coordinate, Y coordinate and Z coordinate of the hand base 25a of the parallel joint mechanism 20, the angle in the pitch direction and initial angle in the yaw direction of the electric wire grasping main unit 25b and the initial angle of the electric wire grasping main unit 25b in the roll direction and make the control device 70 recognize these numerical values in the initial state. The initial position of the X coordinate, the Y coordinate and the Z coordinate of the hand base 25a is determined by a predetermined position of the conveyance chuck 33 of the electric wire conveyer 30. That is, the initial position of the hand base 25a is determined so that the electric wire chuck 25c is situated a predetermined distance above the conveyance chuck 33 that is in a state that where the mobile unit 32 grasping the electric wire 90 is situated in a predetermined position where it is to hand the electric wire to the parallel joint mechanism 20 (the positive direction of the Z axis). More strictly, the initial position of the hand base 25a is set to a position where the conveyance chuck 33 is sandwiched between the front side chuck 25c1 and the rear side chuck 25c2 of the electric wire chuck 25c when the electric wire chuck 25c and the conveyance chuck 33 are viewed in the Z axis direction. For this reason, when the electric wire 90 grasped by the conveyance chuck 33 is grasped by the electric wire chuck 25c, the front and rear sides of the conveyance chuck 33 are grasped by the front side chuck 25c1 and the rear side chuck 25c2.

The predetermined position where the mobile unit 32 is to hand the electric wire to the parallel joint mechanism 20 is constitutionally set on the electric wire conveyer 30 by providing a stopper in a predetermined position of the conveyance rail 31 or performing positioning by the encoder information of the motor of the mobile unit 32. By the worker previously measuring this predetermined position and setting it in the control device 70 or by storing the encoder information of the motor of the mobile unit 32 on the side of the electric wire conveyer 30, the control device 70 can set the initial position of the X coordinate, the Y coordinate and the Z coordinate of the hand base 25a of the parallel joint mechanism 20 based on the predetermined position.

The sensor mount rail 44 of the terminal measurement sensor 40 is positioned with respect to the conveyance chuck 33 that is in the state that where the mobile unit 32 grasping the electric wire 90 is situated in the predetermined position where it is to hand the electric wire to the parallel joint mechanism 20. That is, the sensor mount rail 44 is positioned in a position where the electric wire 90 grasped by the conveyance chuck 33 and ideally extending in the Y axis direction without any hanging down or springback passes the origin point O of the X and Z coordinates (see FIG. 6B) measured by the X measurement sensor 42 and the Z measurement sensor 43. Moreover, the initial position of the sensor mount 41 of the terminal measurement sensor 40 is determined by the encoder information of the drive source 46. This initial position is a position where the leading end of the terminal 91 of the grasped electric wire 90 is separated from the detection area of the X measurement sensor 42 and the Z measurement sensor 43 and a certain distance can be secured between the two members.

To summarize the above, in the control device 70, the following items are set as initial values:
the initial position of the stationary disk 10;
the initial position of the rail member 12 with respect to the stationary disk 10;
the initial positions of the cavities 81 of the connector housings 80 arranged on the stationary disk 10;
the initial position of the X coordinate, the Y coordinate and the Z coordinate of the hand base 25a;
the initial angles of the angle in the pitch direction and angle in the yaw direction of the electric wire grasping main unit 25b;
the initial angle of the angle of the electric wire grasping main unit 25b in the roll direction;
the initial position of the mobile unit 32 with respect to the conveyance rail 31; and
the initial position of the sensor mount 41 of the terminal measurement sensor 40.

[Terminal Insertion Processing]

Subsequently, a series of processing for inserting the terminal 91 into the connector housing 80 will be described in detail. FIG. 8A, FIG. 9A, FIG. 10A, FIG. 11A and FIG. 12A are each a perspective view showing a step of the terminal insertion processing by the terminal insertion device of the embodiment of the present invention. Moreover, FIG. 8B, FIG. 9B, FIG. 10B, FIG. 11B and FIG. 12B are enlarged views of relevant parts of the corresponding FIG. 8A, FIG. 9A, FIG. 10A, FIG. 11A and FIG. 12A, respectively. The driving of each piece of equipment described below is in accordance with a control signal from the control device 70.

Figure 8A:
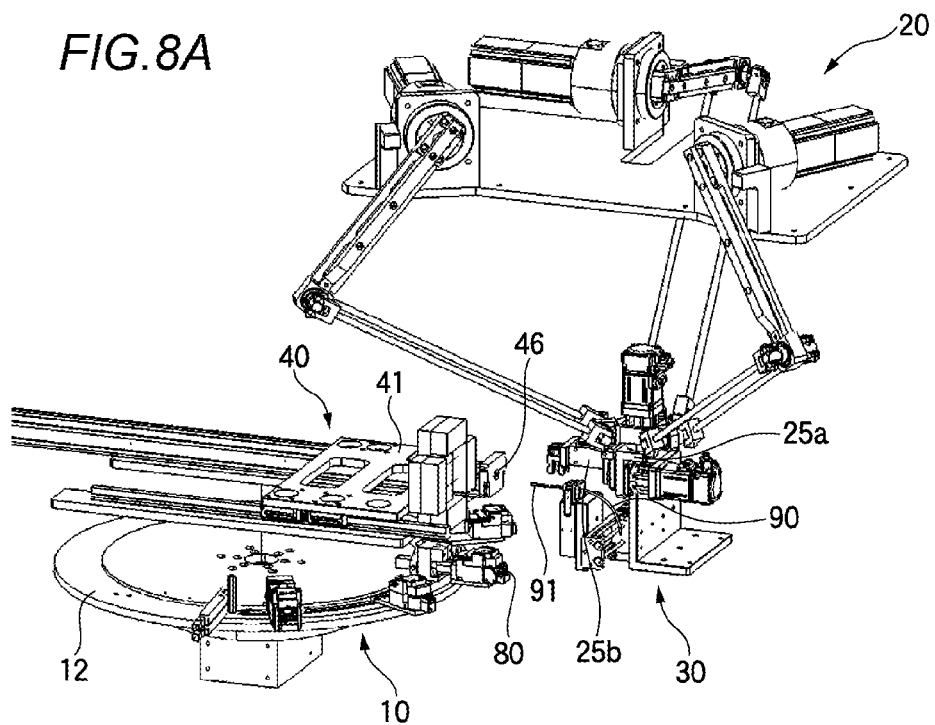
FIG. 8A is a perspective view showing a step of the terminal insertion processing by the terminal insertion device of the embodiment of the present invention.
Figure 8B:
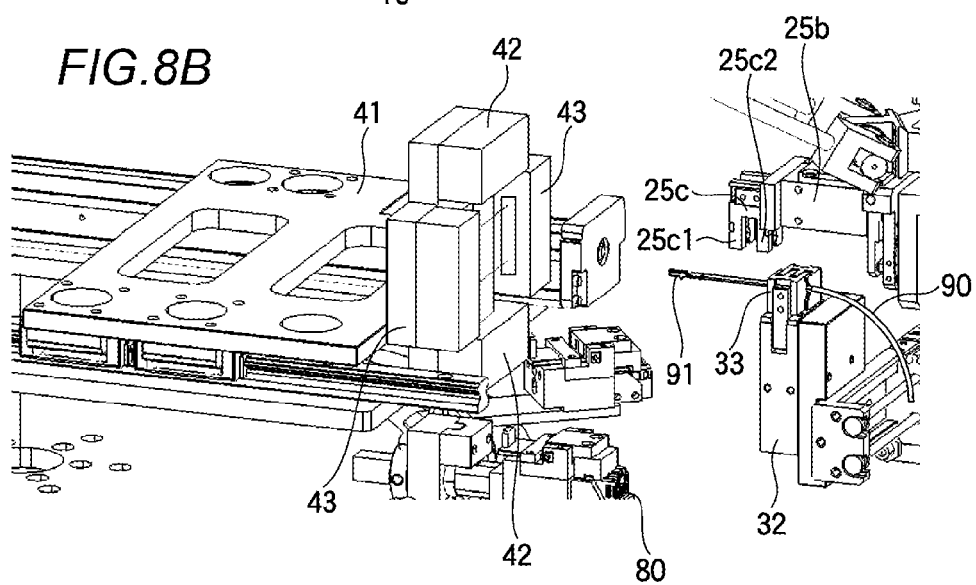
FIG. 8B is an enlarged view of a relevant part of FIG. 8A.

First, as shown in FIG. 8A and FIG. 8B, when the previous series of processing for inserting the terminal 91 into the connector housing 80 is ended, the parallel joint mechanism 20 moves the hand base 25a to the initial position of the X coordinate, the Y coordinate and the Z coordinate, and revolves so that the angle in the pitch direction and angle in the yaw direction of the electric wire grasping main unit 25b are returned to the initial angles. Further, it revolves so that the angle of the electric wire grasping main unit 25b in the roll direction is returned to the initial angle.

Moreover, to the stationary disk 10, when the previous series of processing for inserting the terminal 91 into the connector housing 80 is ended, a control signal from the control device 70 is inputted to rotate the rail member 12, so that the connector housing 80 into which the terminal 91 is to be inserted in this series of processing circularly moves toward the electric wire grasping main unit 25b of the parallel joint mechanism 20. Such control of circular driving of the stationary disk 10 can be realized because the initial positions of the connector housings 80 arranged on the stationary disk 10 are set in the control device 70 in [Positioning setting processing]. Further, in this circular movement, it is preferable to circularly move the connector housing 80 to a position where the cavity 81 into which the terminal 91 is to be inserted in this series of processing is parallel to the Y axis. Such control of circular driving of the stationary disk 10 can also be realized because the position of the opening of the cavity 81 in the connector housing 80 is preregistered.

Moreover, in the electric wire conveyer 30, as shown in FIG. 8A and FIG. 8B, the mobile unit 32 with the conveyance chuck 33 grasping the electric wire moves to a predetermined position.

Figure 9A:
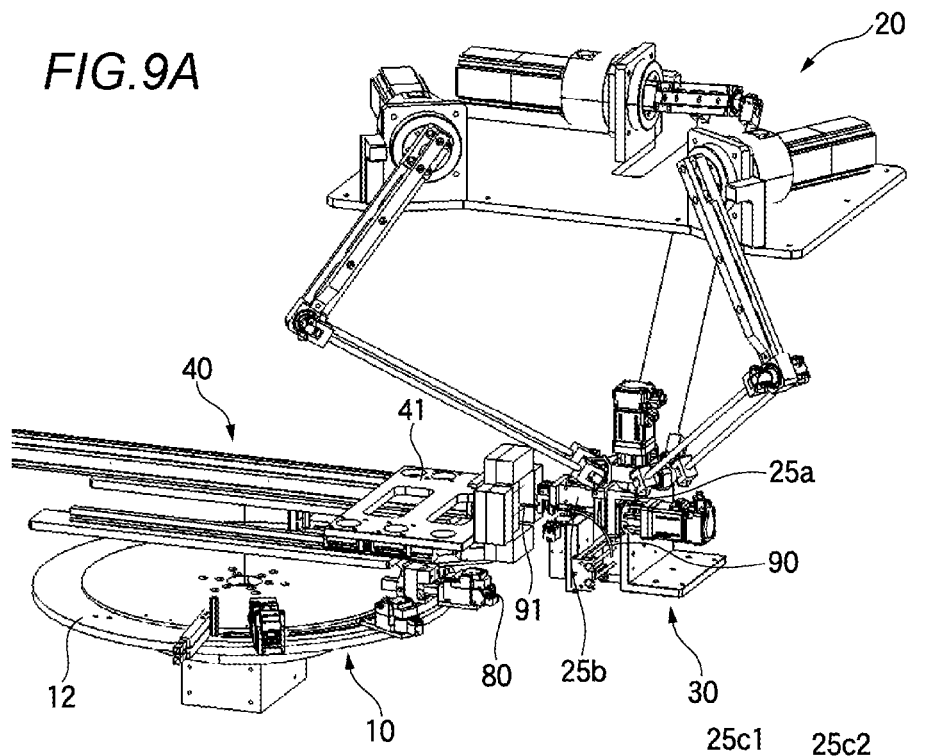
FIG. 9A is a perspective view showing a step of the terminal insertion processing by the terminal insertion device of the embodiment of the present invention.
Figure 9B:
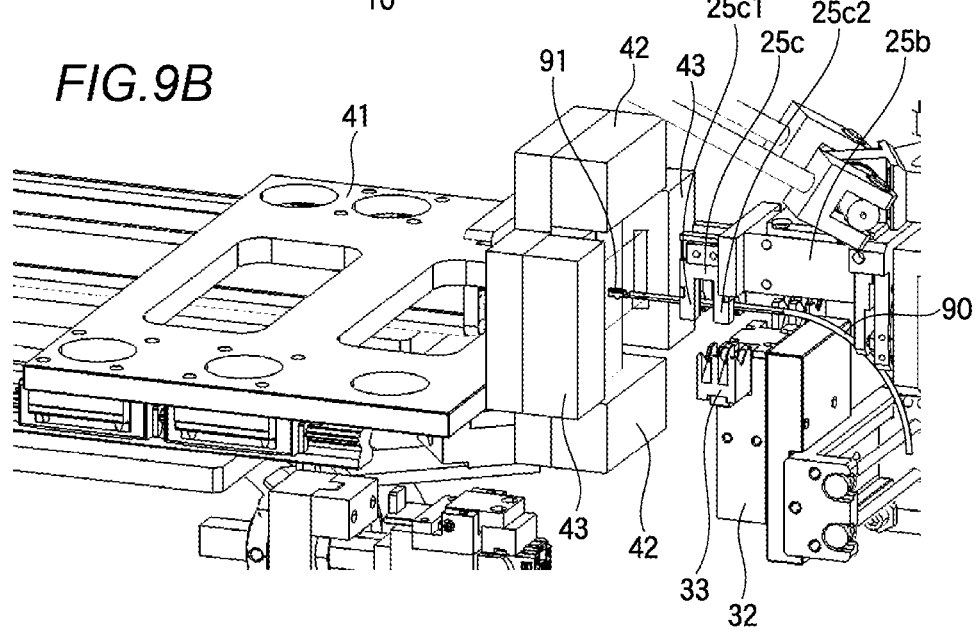
FIG. 9B is an enlarged view of a relevant part of FIG. 9A.

Then, in the parallel joint mechanism 20, when the movement of the mobile unit 32 to the predetermined position is completed, as shown in FIG. 9A and FIG. 9B, the hand base 25a moves a predetermined distance downward (the negative direction of the Z axis). Then, the electric wire chuck 25c grasps the electric wire 90 grasped by the conveyance chuck 33. By the electric wire chuck 25c thus grasping the electric wire 90 grasped by the conveyance chuck 33, the parallel joint mechanism 20 can directly grasp the electric wire 90 from the electric wire conveyer 30 and it is unnecessary to re-grasp the electric wire. As a consequence, a position shift between the measured position of the terminal and the actual position of the terminal which position shift is incident to the re-grasping of the electric wire never occurs in the terminal measurement described below.

In the terminal measurement sensor 40, when the electric wire 90 is grasped by the electric wire chuck 25c of the parallel joint mechanism 20, the sensor mount 41 starts to move forward from the initial position toward the electric wire grasping main unit 25b of the parallel joint mechanism 20. Then, when reaching the position determined by the encoder information of the drive source 46, the sensor mount 41 stops its movement.

Figure 10A:
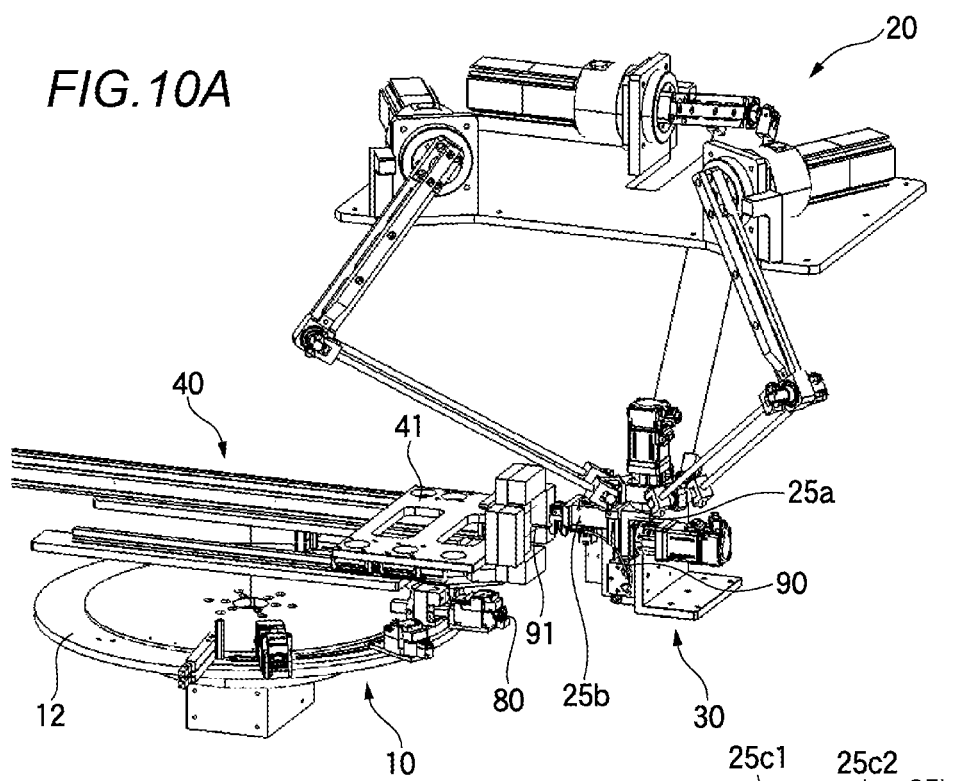
FIG. 10A is a perspective view showing a step of the terminal insertion processing by the terminal insertion device of the embodiment of the present invention.
Figure 10B:
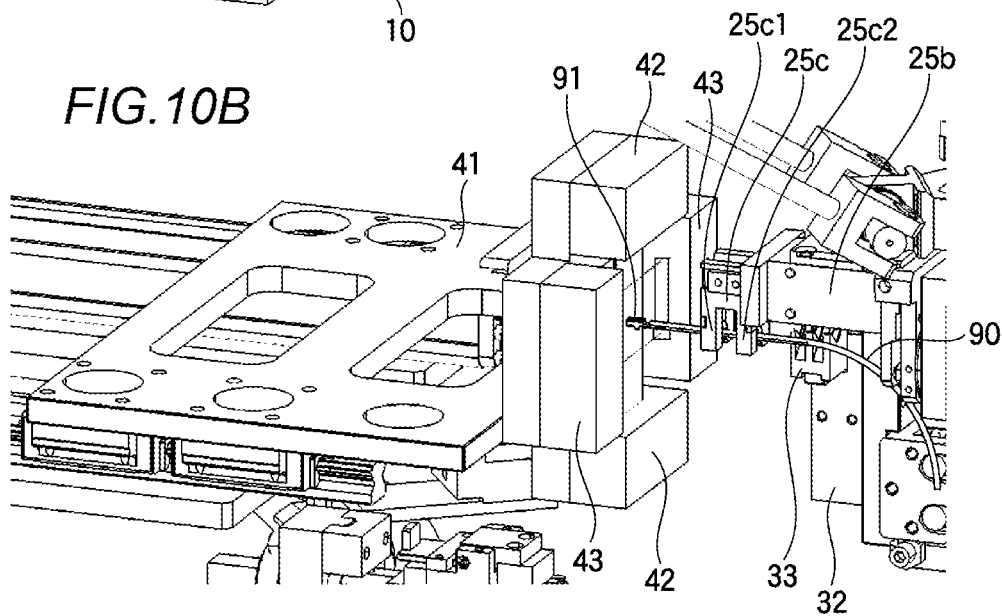
FIG. 10B is an enlarged view of a relevant part of FIG. 10A.

In the electric wire conveyer 30, when the movement of the sensor mount 41 is completed, as shown in FIG. 9A and FIG. 9B, the mobile unit 32 opens the conveyance chuck 33 to release the electric wire 90. Thereafter, as shown in FIG. 10A and FIG. 10B, the mobile unit 32 moves away from the predetermined position in order to grasp the next electric wire 90.

When the movement of the sensor mount 41 is completed, in the detection area of the X measurement sensor 42 and the Z measurement sensor 43, as shown in FIG. 9A and FIG. 9B, the leading end of the terminal 91 is situated. At this time, to the control device 70, light intensity distributions detected by the X measurement sensor 42 and the Z measurement sensor 43 are inputted. Based on these light intensity distributions, the control device 70 recognizes the coordinates of the points representing the external contour shape of the terminal 91, and based on these pieces of measurement information, calculates the rotation angle in the roll direction, width dimension (component dimension in the X direction), height dimension (component dimension in the Z direction) and XZ position coordinates with respect to the leading end of the terminal 91.

Figure 13A:
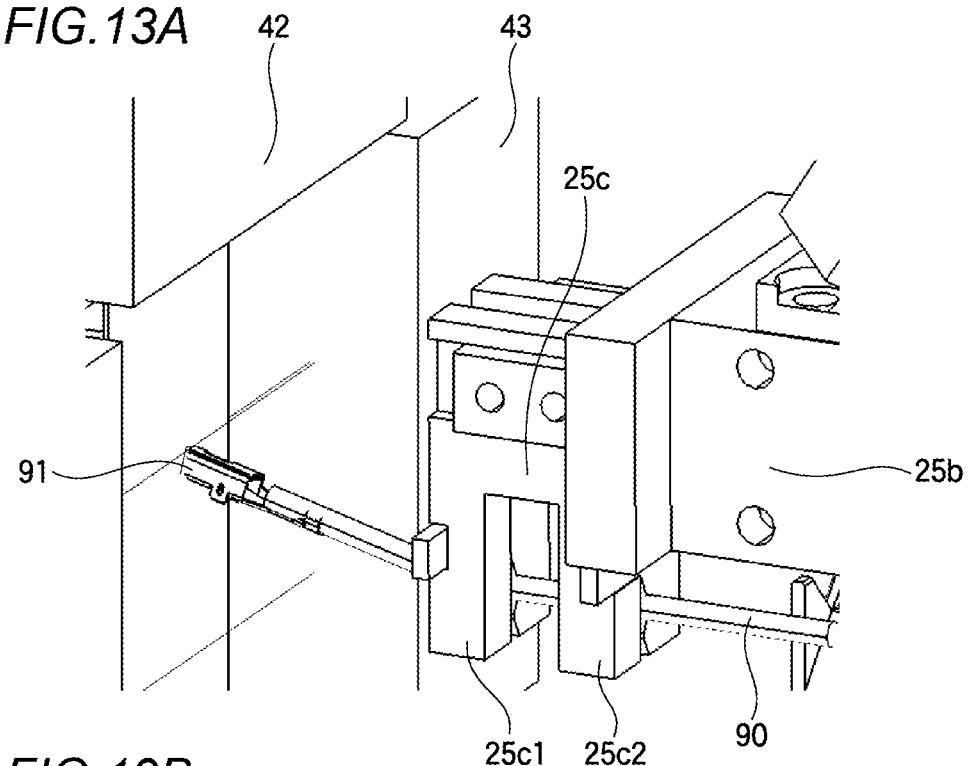
FIG. 13A is a perspective view showing a condition where the leading end of the terminal is situated in the detection area of an X measurement sensor and a Z measurement sensor.

FIG. 13A is an explanatory view showing a condition where the leading end of the terminal is situated in the detection area of the X measurement sensor and the Z measurement sensor. As shown in FIG. 13A, there are cases where the terminal 91 is rotated in the roll direction. Further, there are cases where the electric wire 90 grasped by the electric wire chuck 25c springs back with the front side chuck 25c1 of the electric wire chuck 25c as the fulcrum to be bent upward (the positive direction of the Z axis), or rightward or leftward (the X axis direction) (conversely, there are also cases where it hangs down to be bent downward [the negative direction of the Z axis], or rightward or leftward [the X axis direction]).

The terminal 91 is, in many cases, rectangular in the cross section in the direction orthogonal to the insertion direction (Y axis). Moreover, the shape of the cavity 81 of the connector housing 80 is also an equal shape coinciding with the cross-sectional shape of the terminal 91. For this reason, when the terminal 91 is rotated in the roll direction with respect to the reference direction as in FIG. 13A, since the shapes of the terminal 91 and the cavity 81 do not coincide with each other because of a relative inclination, there is a possibility that the insertion fails. Moreover, when it is attempted to insert the terminal 91 into the cavity 81 of the connector housing 80 while the electric wire 90 remains springing back, the terminal 91 cannot be inserted into the cavity 81, either, or even if it can be inserted, there is a possibility that the electric wire 90 or the terminal 91 is broken. In particular, since the electric wire 90 is soft in many cases, it readily buckles when an excessive force is applied, and this makes normal insertion impossible.

For this reason, in the terminal insertion device of the embodiment of the present invention, the control device 70 quantitatively calculates the rotation angle of the terminal 91 in the roll direction and the hanging down amount or the springback amount of the electric wire 90 based on the light intensity distributions detected by the X measurement sensor 42 and the Z measurement sensor 43. Then, the control device 70 further returns the rotation of the terminal 91 in the roll direction to 0 degrees based on the calculated numerical values, and calculates the rotation angle of the electric wire grasping main unit 25b in the roll direction and the rotation angles of the electric wire grasping main unit 25b in the pitch direction and the yaw direction for disposing the hanging down or springing back electric wire 90 parallel to the Y axis.

Figure 14A:
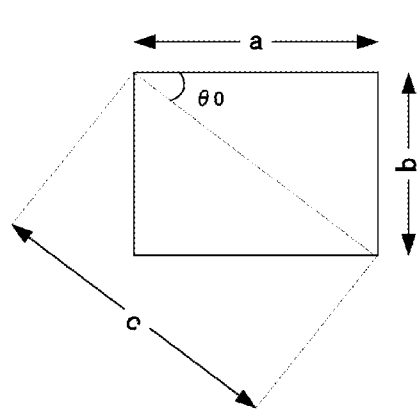
FIG. 14A, FIG. 14B and FIG. 14C are schematic views for explaining the rotation in each direction.
Figure 14B:
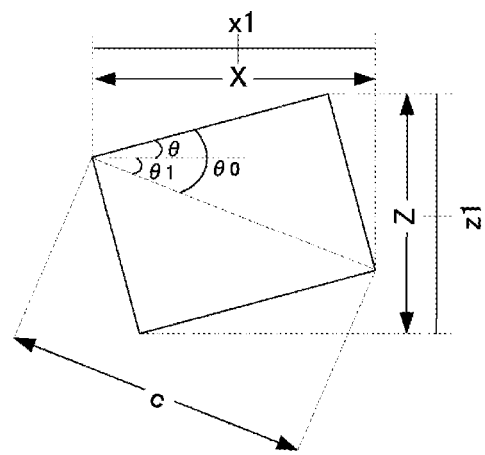

Now, the calculation technique for calculating the rotation angles of the electric wire grasping main unit 25b and the terminal 91 in the roll direction will be described. FIG. 14A and FIG. 14B are explanatory views explaining the technique to calculate the rotation angle of the terminal in the roll direction; FIG. 14A shows a case where the rotation angle is 0 and FIG. 14B shows a case where the rotation angle is θ.

That is, FIG. 14A and FIG. 14B show the cross-sectional shape at the cross section in the direction orthogonal to the insertion direction of the leading end of the terminal 91 (Y axis). The example shown in FIG. 14A and FIG. 14B assume a case where the cross-sectional shape of the terminal 91 is rectangular, the width dimension thereof is "a", the height dimension thereof is "b" and the diagonal dimension thereof is "c". At this time, as shown in FIG. 14A, the angle $\theta_0$ formed by one side in the width direction and the diagonal line is given by the following expression:

$$\theta_0 = \cos^{-1}(a/c) \quad (1)$$

Moreover, when the terminal 91 in the condition shown in FIG. 14A is rotated by the angle θ in the roll direction, the condition becomes as shown in FIG. 14B.

On the other hand, the information on the width dimension of the terminal 91 obtained by the measurement by the X measurement sensor 42 is the width between the ends of the contour shape in the X axis direction (the horizontal direction in FIG. 14B), and is the width dimension "X" shown in FIG. 14B. That is, a difference corresponding to the angle θ in the roll direction occurs between the actual width dimension "a" of the terminal 91 and the width dimension "X" obtained by the measurement.

Likewise, the information on the height dimension of the terminal 91 obtained by the measurement by the Z measurement sensor 43 is the width between the ends of the contour shape in the Z axis direction (the vertical direction in FIG. 14B), and is the height dimension "Z" shown in FIG. 14B. That is, a difference corresponding to the angle θ in the roll direction occurs between the actual height dimension "b" of the terminal 91 and the height dimension "Z" obtained by the measurement.

Taking advantage of such differences, the angle θ in the roll direction can be calculated. That is, as shown in FIG. 14B, when the angle $\theta_1$ formed by the diagonal line and the X axis direction is defined, the rotation angle θ in the roll direction is given by the following expression:

$$\theta = \theta_0 - \theta_1 = \cos^{-1}(a/c) - \cos^{-1}(X/c) \quad (2)$$

Moreover, the width dimension "a" and the height dimension "b" of the terminal 91 can be previously obtained as constants if variations in dimension among the components are ignored. Moreover, the diagonal dimension "c" can be calculated, for example, by using the following expression:

$$c = \sqrt{(a^2 + b^2)} \quad (3)$$

Therefore, the rotation angle θ in the roll direction can be calculated based on the diagonal dimension "c" of the terminal 91 and the width dimension "X" obtained from the measurement result. Moreover, by providing the rotation angle θ calculated in this way to the electric wire grasping main unit 25b as a compensation control parameter and rotating it, the rotation of the terminal 91 in the roll direction can be compensated. In actuality, since there are cases where the part from the position where the electric wire 90 is grasped to the terminal 91 at the leading end thereof is inclined in the yaw direction and in the pitch direction with respect to the Y axis direction, when the rotation in the roll direction is compensated, three-dimensional control is performed for rotation in the roll direction with the center of the terminal 91 as the rotation axis. That is, the electric wire grasping main unit 25b is rotated and simultaneously with this, the position where the electric wire 90 is grasped is moved in each of the X axis, Y axis and Z axis directions to perform control so that the position of the rotation axis of the terminal 91 is not shifted. The parallel joint mechanism 20, as shown in FIG. 10A and FIG. 10B, compensates the rotation in the roll direction after the measurement by the terminal measurement sensor 40.

In calculating the angle θ in the roll direction, the calculation may also be performed based on the diagonal dimension "c" of the terminal 91 and the height dimension "Z" obtained from the measurement result. For example, if the cross-sectional shape of the terminal 91 is a shape close to a square like a square terminal, either the width dimension "X" or the height dimension "Z" may be used. However, when the cross-sectional shape is oblong like a flat terminal, because of the difference in the measurement dimension change with respect to the rotation in the roll direction, the accuracy can be higher when the height dimension "Z" is used. That is, which of the width dimension "X" and the height dimension "Z" is used is determined in consideration of the difference in the cross-sectional shape of the actually inserted terminal 91.

Figure 14C:
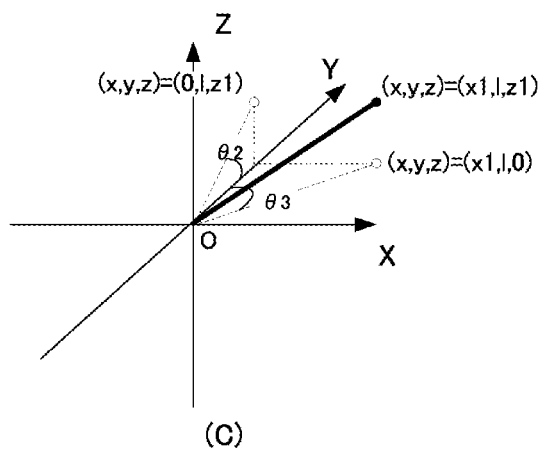

Subsequently, the calculation technique for calculating the rotation angle in the pitch direction and rotation angle in the yaw direction of the electric wire grasping main unit 25b will be described. FIG. 14C is an explanatory view explaining the technique to calculate the rotation angle in the pitch direction and rotation angle in the yaw direction of the electric wire grasping main unit 25b. As shown in FIG. 14B, the X coordinate of the leading end of the terminal 91 can be determined as the middle point x1 of the center of the above-mentioned width dimension. Likewise, the Z coordinate of the leading end of the terminal 91 can be determined as the middle point z1 of the center of the above-mentioned height dimension "Z".

Figure 6B:
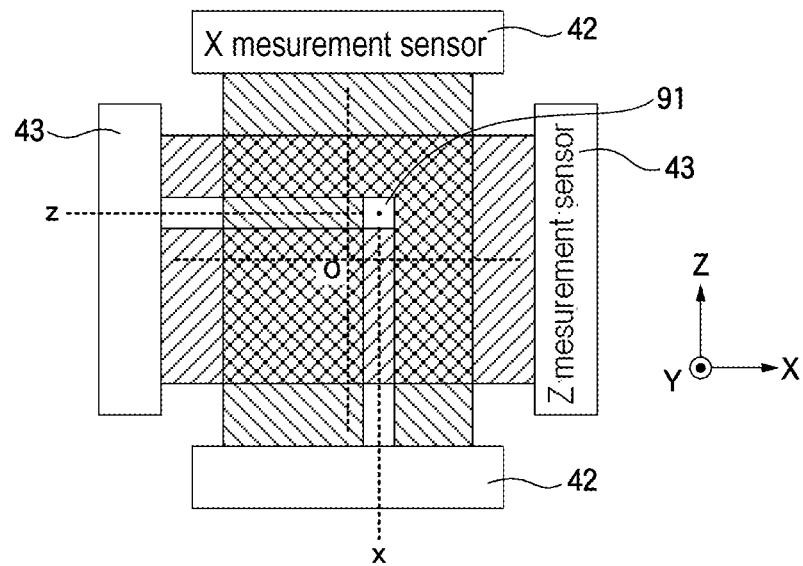
FIG. 6B is a front view showing the positional relationship between the area of detection by the measurement sensor and the terminal.

The sensor mount 41 and the sensor mount rail 44 are positioned in a position where the electric wire 90 ideally extending in the Y axis direction passes the origin point O of the X and Z coordinates measured by the X measurement sensor 42 and the Z measurement sensor 43 (see FIG. 6B). The distance I to the detection area on the sensor mount 41 having moved forward from the front side chuck 25c1 of the parallel joint mechanism 20 is known. For this reason, when the position of the front side chuck 25c1 is regarded as the origin point as shown in FIG. 14C, the rotation angle $\theta_2$ in the pitch direction and rotation angle $\theta_3$ in the yaw direction of the electric wire grasping main unit 25b are given by the following expressions:

$$\theta_2 = \tan^{-1}(z1/1) \quad (4);$$

and $$\theta_3 = \tan^{-1}(x1/1) \quad (5).$$

By this calculation technique, the rotation angle in the pitch direction and rotation angle in the yaw direction of the electric wire grasping main unit 25b are calculated. The parallel joint mechanism 20, as shown in FIG. 11A and FIG. 11B, compensates the rotations in the pitch direction and in the yaw direction after the measurement by the terminal measurement sensor 40.

Figure 13B:
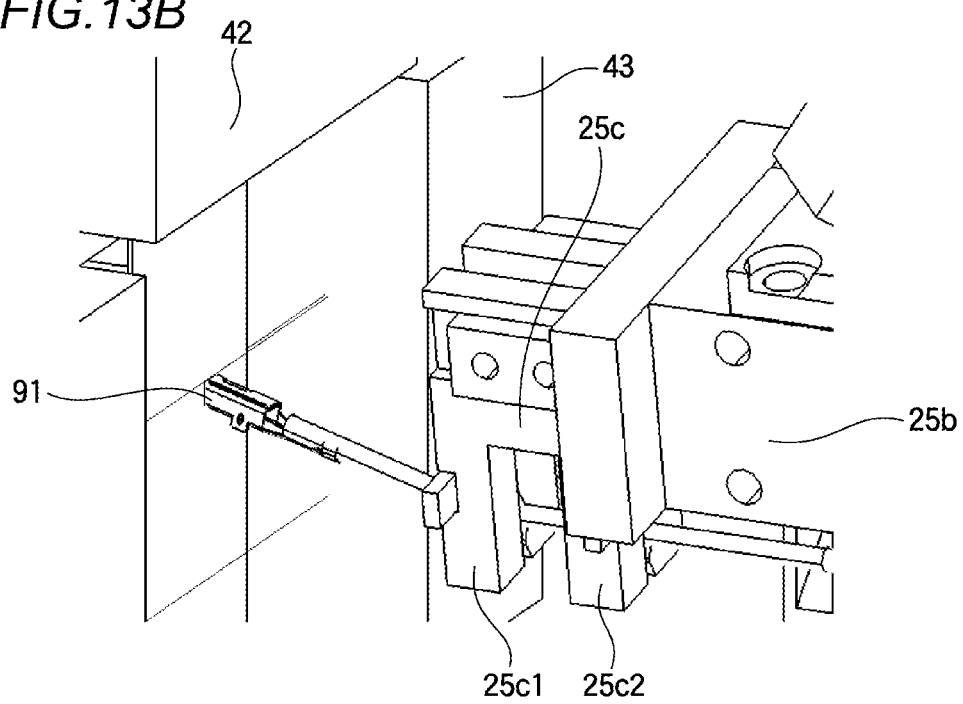
FIG. 13B is a perspective view showing a condition where the rotation of the terminal in the roll direction is returned to zero and the electric wire is disposed parallel to the Y axis.

The condition shown in FIG. 13B represents a condition where the rotation angle θ of the terminal 91 in the roll direction is compensated to zero, the orientation of the inclined electric wire 90 in the yaw direction is compensated and the orientation thereof in the pitch direction is not compensated. That is, based on the result of the measurement of the terminal 91, the control device 70 revolves the hand base 25a and the electric wire grasping main unit 25b by the calculated rotation angle in the yaw direction and rotation angle in the roll direction in a direction that cancels the rotation. As a consequence, as shown in FIG. 13B, the electric wire grasping main unit 25b can grasp the electric wire 90 in a state that the rotation angle of the terminal 91 in the roll direction is returned to zero degrees, the orientation of the electric wire 90 in the yaw direction is compensated and the orientation thereof in the pitch direction is not compensated. In a state that orientation in the pitch direction is not compensated is referred to, the electric wire 90 may be grasped in such a manner that the orientation in the pitch direction is compensated so that the electric wire 90 extends parallel to the Y axis.

Figure 11A:
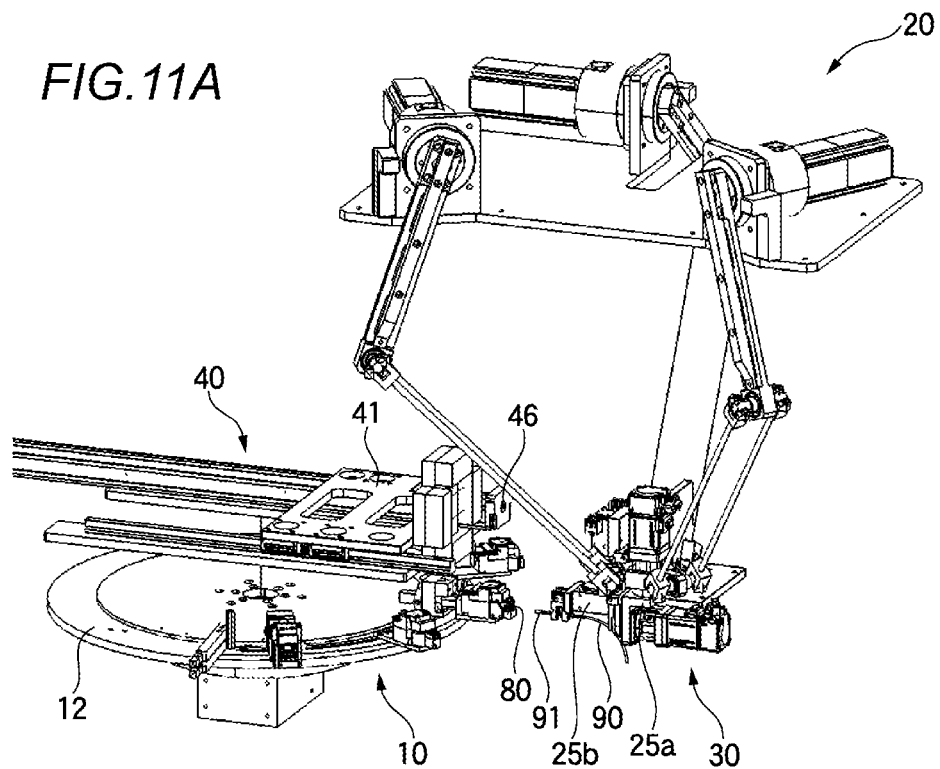
FIG. 11A is a perspective view showing a step of the terminal insertion processing by the terminal insertion device of the embodiment of the present invention.
Figure 11B:
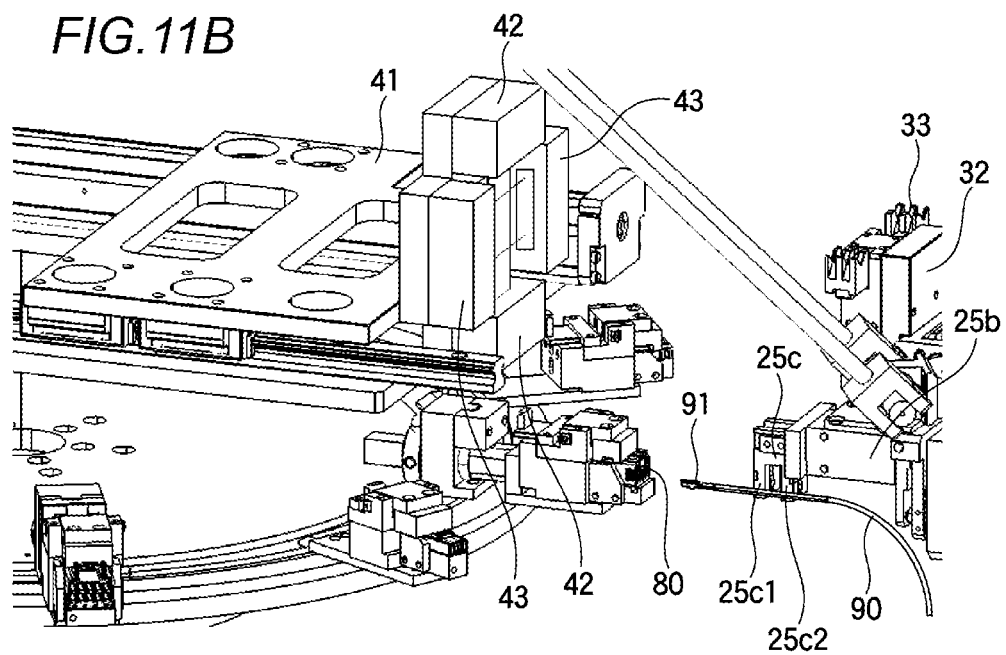
FIG. 11B is an enlarged view of a relevant part of FIG. 11A.

In the terminal measurement sensor 40, after the hand base 25a and the electric wire grasping main unit 25b are revolved, as shown in FIG. 11A and FIG. 11B, the sensor mount 41 moves to the initial position.

After the sensor mount 41 is moved to the initial position, as shown in FIG. 11A and FIG. 11B, the parallel joint mechanism 20 drives the hand base 25a in the X axis direction and in the Z axis direction and inserts the terminal 91 into the cavity 81. At this time, in the control device 70, the distance to where the terminal 91 is locked within the cavity 81 in the connector housing 80 is set. For this reason, the control device 70 drives the parallel joint mechanism 20 so that the hand base 25a moves in the positive direction of the Y axis by this distance. At this time, from the signal detected by the pressure sensor 25g, the control device 70 determines buckling of the terminal 91 or the interference of the terminal 91 with the stationary disk 10 when the terminal 91 is not inserted into the cavity. Only the outline of the time of the terminal insertion processing of the present invention is described here, and the control of the revolution of the electric wire 90 in the roll direction and the yaw direction and the movement of the XYZ coordinate system of the hand base 25a will be described in [Description of the processing procedure of the characteristic control] shown below.

When the hand base 25a is moved in the positive direction of the Y axis, the parallel joint mechanism 20 then slightly moves the hand base 25a in the negative direction of the Y axis. Here, the electric wire grasping main unit 25b is provided with the pressure sensor 25g that detects the external force acting on the electric wire chuck 25c. When the terminal 91 is normally inserted in the cavity 81, the terminal 91 is engaged with the lance in the cavity 81. For this reason, if the terminal 91 is normally inserted in the cavity 81, when the hand base 25a is slightly moved in the negative direction of the Y axis, the pressure sensor 25g should detect a tension equal to or higher than a certain threshold value which tension acts on the electric wire 90. Conversely, if the terminal 91 is not normally inserted in the cavity 81, when the hand base 25a is slightly moved in the negative direction of the Y axis, the pressure sensor 25g should detect no external force or should detect a tension less than the threshold value. As described above, the parallel joint mechanism 20 determines whether the terminal 91 is normally inserted or not by slightly moving the hand base 25a in the negative direction of the Y axis. When the terminal 91 is not normally inserted in the cavity 81, the parallel joint mechanism 20 may discard the electric wire 90 into a trash can by moving the hand base 25a onto the trash can and opening the electric wire chuck 25c there. Thereafter, when the present series of processing for inserting the terminal 91 into the connector housing 80 is ended, the parallel joint mechanism 20 moves the hand base 25a to the initial position of the X coordinate, the Y coordinate and the Z coordinate, and revolves so that the angle in the pitch direction and angle in the yaw direction of the electric wire grasping main unit 25b are returned to the initial angles. Further, it revolves so that the angle of the electric wire grasping main unit 25b in the roll direction is returned to the initial angle.

[Description of the Processing Procedure of the Characteristic Control]

Figure 15:
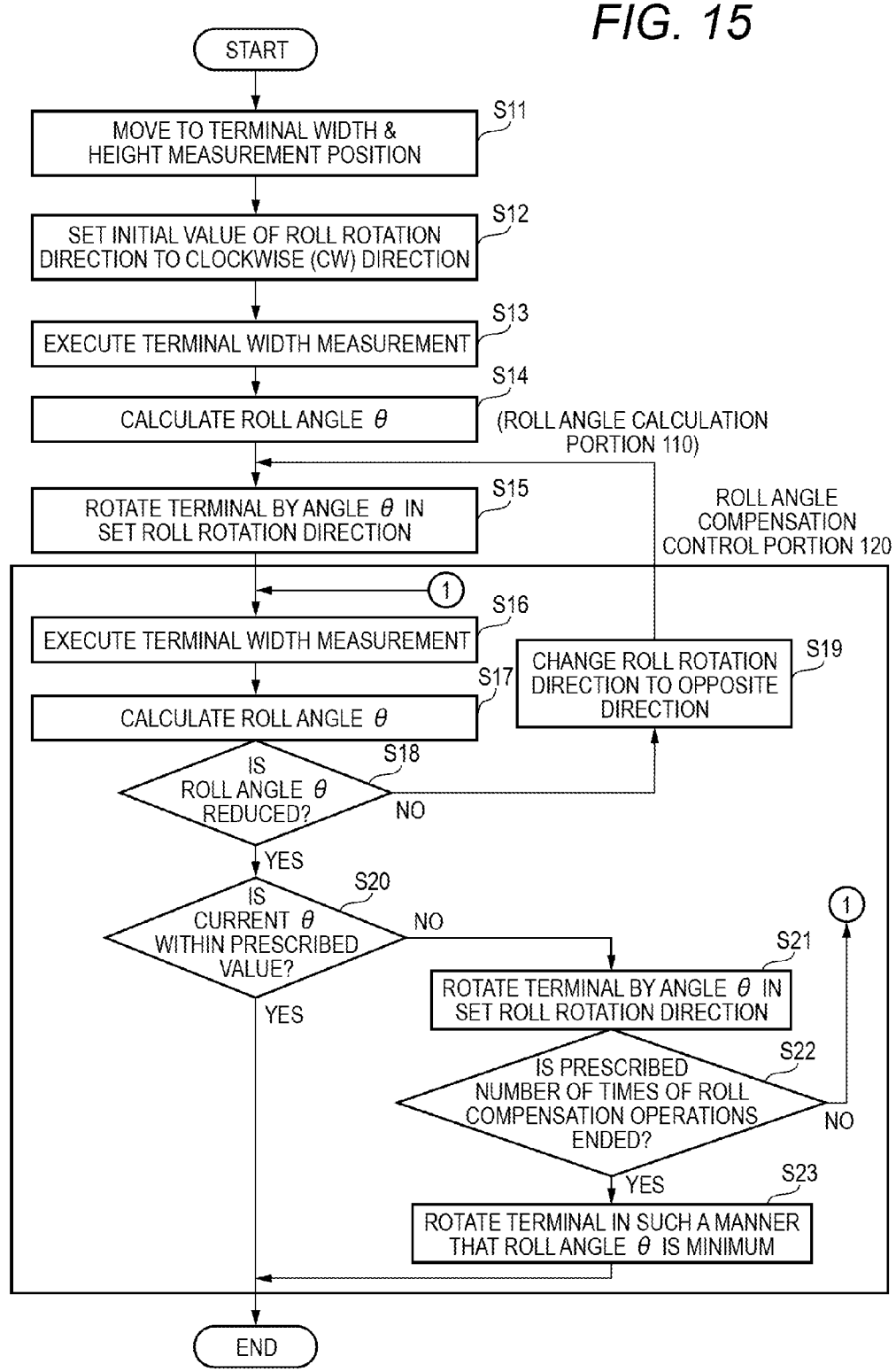
FIG. 15 is a flowchart showing the processing procedure of the roll angle compensation control in the terminal insertion device of the embodiment of the present invention.
Figure 16:
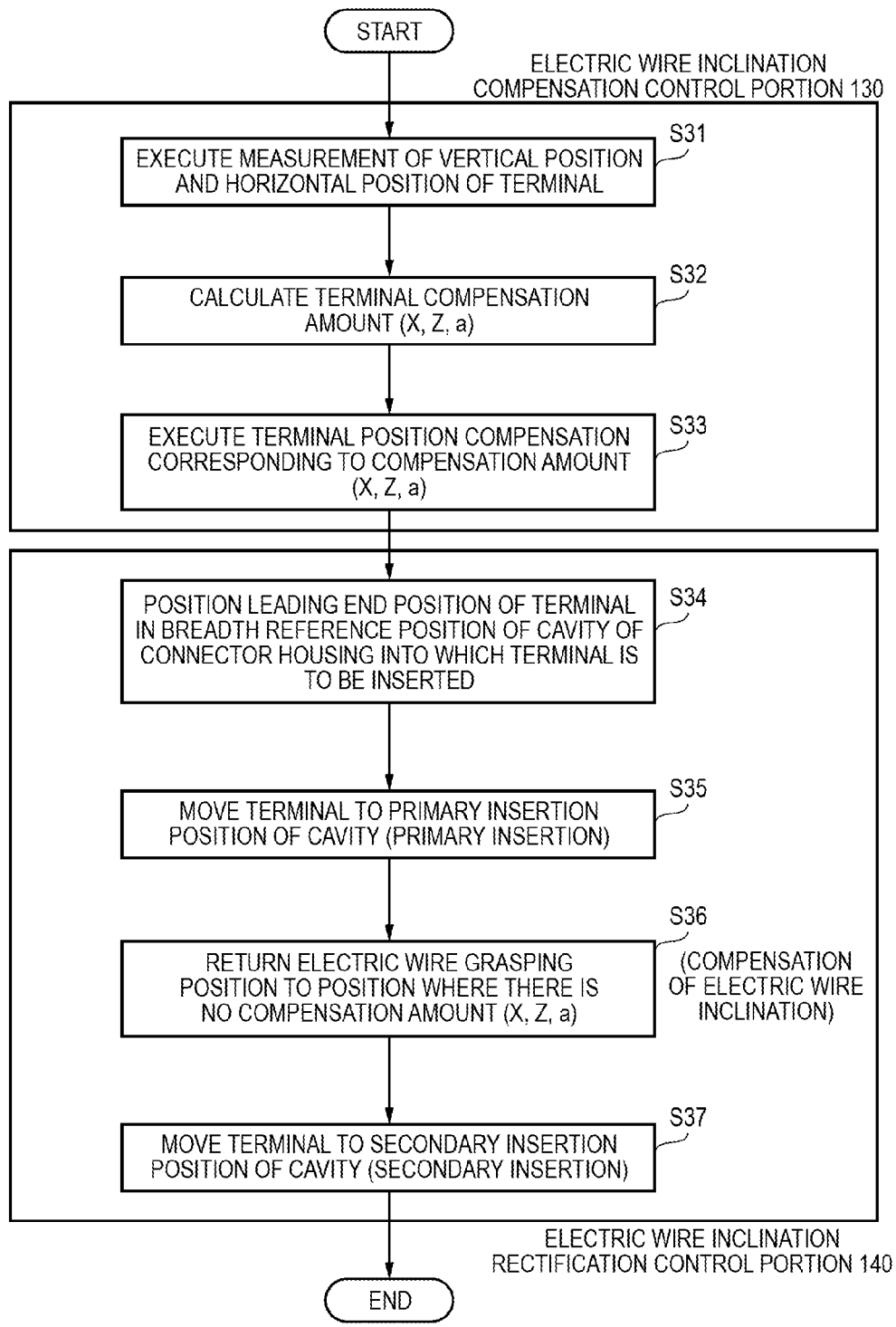
FIG. 16 is a flowchart showing the processing procedure of the electric wire inclination compensation control in the terminal insertion device of the embodiment of the present invention.

FIG. 15 shows the processing procedure of the roll angle compensation control in the terminal insertion device of the embodiment of the present invention. Moreover, FIG. 16 shows the processing procedure of the electric wire inclination compensation control in the terminal insertion device of the embodiment of the present invention. These controls are executed by the control device 70. Moreover, a roll angle calculation portion 110 and a roll angle compensation control portion 120 shown in FIG. 15 are provided to the control device 70. Moreover, an electric wire inclination compensation control portion 130 and an electric wire inclination rectification control portion 140 shown in FIG. 16 are provided to the control device 70.

<Roll Angle Compensation Control>

The processing procedure of the roll angle compensation control shown in FIG. 15 will be described below. It is the control device 70 that executes this control.

As in the condition shown in FIG. 9A and FIG. 9B, the mobile unit 32 moves to a predetermined position, the parallel joint mechanism 20 moves down and grasps the electric wire 90, and the conveyance chuck 33 opens. At this time, simultaneously with this, at step S11, the terminal measurement sensor 40 detects the leading end of the terminal 91, and the control device 70 performs control so that the position of the sensor mount 41 is moved to a position where measurement can be performed.

At step S12, the control device 70 determines the initial value of the rotation direction for compensating the rotation of the terminal 91 in the roll direction. In the present embodiment, the clockwise direction (CW) is set as the initial value.

At step S13, the width dimension of the contour of the terminal 91 in the X axis direction is detected based on the received light intensity distribution in the X axis direction detected by the light receiving portion of the X measurement sensor 42. Moreover, the height dimension of the contour of the terminal 91 in the Z axis direction is detected based on the received light intensity distribution in the Z axis direction detected by the light receiving portion of the Z measurement sensor 43. That is, at least one of the width dimension "X" and the height dimension "Z" shown in FIG. 14B is obtained as the measurement result.

At step S14, the roll angle calculation portion 110 calculates the current rotation angle θ of the terminal 91 in the roll direction (the rotation amount with respect to the reference condition shown in FIG. 14A) by the following expression:

$$\theta = \theta_0 - \theta_1 = \cos^{-1}(a/c) - \cos^{-1}(X/c) \quad (6)$$

where $\theta_0$ is the angle formed by one side in the width direction and the diagonal line;

$\theta_1$ is the angle formed by the diagonal line and the X axis direction;

c is the diagonal dimension which is calculated based on the width dimension "a" and the height dimension "b" of the terminal 91;

a is a constant determined by the width dimension of the component specifications of the terminal 91;

b is a constant determined by the height dimension of the component specifications of the terminal 91; and X is a width dimension that can be obtained by the measurement value (see FIG. 14B).

At step S15, the terminal 91 is rotated in the roll direction circling around the Y axis with the center of the leading end of the terminal 91 as the rotation center by the rotation angle θ calculated at S14 in the roll rotation direction (CW) set at S12. That is, the hand member 25 grasping the electric wire 90 is moved in the rotation direction in such a manner as to compensate the rotation in the roll direction. At this time, the positions of the X axis, Y axis and Z axis directions are adjusted by the parallel joint mechanism 20 simultaneously with the rotation in order that the center of the rotation does not shift from the position of the central axis of the terminal 91.

Moreover, the rotation angle θ of the terminal 91 in the roll direction can be almost completely compensated only by the single compensation operation at S15. In that case, the process shifts to the insertion operation. In particular, since it is only the contour position of the terminal 91 that can be detected by the terminal measurement sensor 40, it is still unknown in which of the clockwise (CW) and counterclockwise (CCW) roll directions the terminal 91 is shifted, and as a result of the processing of S15, the rotation angle θ in the roll direction is further increased in some cases. Consequently, the control of the roll angle compensation control portion 120 at the next S16 and succeeding steps is further executed.

At step S16, as at S13 described above, the measurement of the terminal 91 is again performed to obtain the width dimension "X" or the height dimension "Z" of the terminal 91. Then, at the next S17, the rotation angle θ in the roll direction is calculated as at S14.

Further, the rotation angle θ obtained at S17 and the rotation angle θ obtained at S14 prior to compensation are compared with each other at S18. That is, whether the rotation angle θ is reduced by the rotation operation at S15 or not is identified at S18. When the rotation angle θ is reduced, the process proceeds to S20, and when the rotation angle θ is not reduced, the process proceeds to S19.

At step S19, the direction of the rotation for compensating the rotation of the terminal 91 in the roll direction is changed to the direction opposite to the direction used up to then. For example, when it is detected at S18 that the rotation angle θ in the roll direction is increased after the rotation direction is set to the clockwise direction (CW) as the initial state at S12, the rotation direction is switched to the counterclockwise direction (CCW) at S19. When S15 is executed after this step S19, roll direction compensation is executed in the switched direction.

At step S20, by comparing the lastly detected rotation angle θ in the roll direction with a threshold value (prescribed value) determined in advance, it is identified whether the rotation angle θ is within the prescribed value or not. When it is within the prescribed value, the processing of FIG. 15 is ended, and when it is higher than the prescribed value, the process proceeds to S21.

At step S21, as at S15, the terminal 91 is rotated about the central axis of the terminal 91 in such a manner as to correct the rotation in the roll direction by the rotation angle θ in the direction set at S12 or in the direction switched at S19.

At step S22, the number of times of execution of the roll compensation operations (S15, S21) performed up to then is compared with the threshold value (prescribed number of times). When the prescribed number of times of roll compensation operations are ended, the process proceeds to S23, and when they have not been ended yet, the process proceeds to step S16 and repeats the processing.

At step S23, the terminal 91 is rotated about the central axis of the terminal 91 in such a manner that the rotation angle θ of the terminal 91 in the roll direction is minimum. That is, the rotation in the roll direction is finally compensated so as to be close to a condition equal to the condition where the rotation angle θ is minimum in the prescribed number of repetitions of the roll operations up to now.

<Example of the Operation by the Roll Angle Compensation Control>

Figure 17:
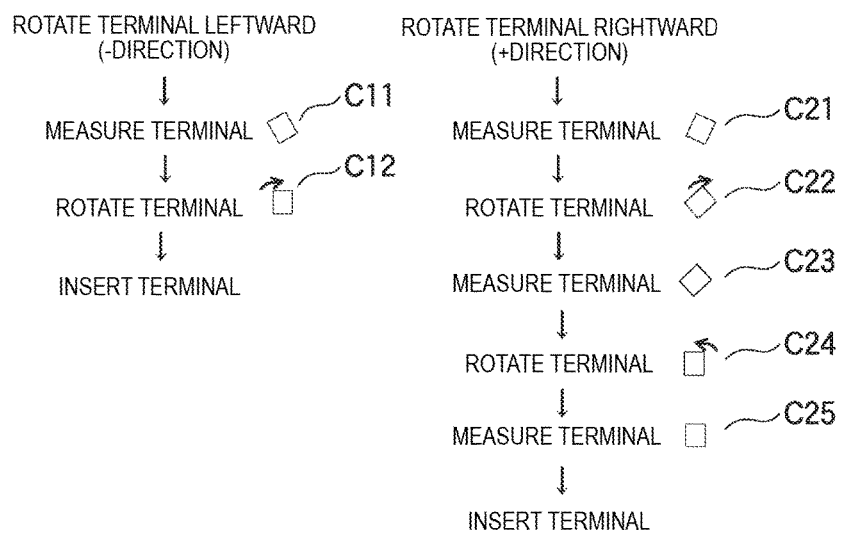
FIG. 17 is a condition transition diagram showing a concrete example of the condition transition of the terminal and the operation when the roll angle of the terminal is compensated.

FIG. 17 is a condition transition diagram showing a concrete example of the condition transition of the terminal and the operation when the roll angle of the terminal is compensated.

When the terminal 91 is shifted by the rotation angle θ in the counterclockwise direction (left rotation: minus direction) with respect to the roll direction in the initial state like the condition C11 shown in FIG. 11, the terminal 91 is rotated clockwise by an amount the same as the rotation angle θ at the first S15 of FIG. 15. Since this brings about a condition where the rotation of the terminal 91 in the roll direction is canceled like the condition C12 shown in FIG. 17, this roll angle compensation control is ended, and the process can shift to the step of inserting the terminal 91 into the cavity 81.

On the other hand, when the terminal 91 is shifted by the rotation angle θ clockwise (right rotation: plus direction) with respect to the roll direction in the initial state like the condition C21 shown in FIG. 17, if the terminal 91 is rotated clockwise by an amount the same as the rotation angle θ at the first S15 of FIG. 15, the rotation angle θ is increased like the condition C22. In this case, since the rotation direction for the compensation is switched at step S19 of FIG. 15, when step S15 is executed next, the terminal 91 rotates counterclockwise. Since this brings about a condition where the rotation of the terminal 91 in the roll direction is canceled like the condition C24 shown in FIG. 17, this roll angle compensation control is ended, and the process can shift to the step of inserting the terminal 91 into the cavity 81.

<Electric Wire Inclination Compensation Control>

The processing procedure of the electric wire inclination compensation control shown in FIG. 16 will be described below. It is the control device 70 that executes this control. Moreover, when the processing shown in FIG. 16 is executed, the control device 70 performs control so that the position of the sensor mount 41 is moved to a position where the terminal measurement sensor 40 can measure the terminal 91. That is, when the mobile unit 32 is moved to a predetermined position, the parallel joint mechanism 20 is moved down and grasps the electric wire 90 and the conveyance chuck 33 is opened under the condition shown in FIG. 9A and FIG. 9B, the processing shown in FIG. 15 is executed.

At step S31, the control device 70 measures the position of the terminal 91 by using the terminal measurement sensor 40. That is, based on the received light intensity distribution in the X axis direction detected by the light receiving portion of the X measurement sensor 42, the area of the width dimension "X" of the contour of the terminal 91 in the X axis direction is detected, and the positional coordinates of this center point x1 are measured (see FIG. 14B). Moreover, based on the received light intensity distribution in the Z axis direction detected by the light receiving portion of the Z measurement sensor 43, the area of the height dimension "Z" of the contour of the terminal 91 in the Z axis direction is detected, and the positional coordinates of this center point z1 are measured. Step S31 is executed under the condition shown in FIG. 13B.

At step S32, the compensation amount (X, Z, a) for the position shift of the leading end of the terminal 91 from the reference position and the rotation is calculated based on the measurement result of S31. The shift of the position of the point x1 from the reference position in the X axis direction which shift is caused by the inclination in the yaw direction of the part of the electric wire 90 ahead from the grasped position is the compensation amount "X", and the shift of the position of the point z1 from the reference position in the Z axis direction which shift is caused by the inclination in the pitch direction is the compensation amount "Z". Moreover, the compensation amount "a" corresponds to the angle of the inclination of the electric wire 90, and corresponds to the rotation angle $\theta_3$ in the yaw direction shown in FIG. 14C.

At step S33, based on the compensation amount (X, Z, a) obtained at S32, the electric wire 90 is revolved in the yaw direction in order to compensate the rotation angle $\theta_3$ in the yaw direction to zero. At this time, since the electric wire grasping main unit 25b revolves in the yaw direction, the leading end of the terminal 91 is situated on the Y axis. On the other hand, at step S33, the shift Z of the leading end of the terminal 91 in the Z axis direction (that is, the rotation angle $\theta_2$ in the pitch direction) is zero and is not canceled. The electric wire 90 in the condition where the position compensation to make the rotation angle in the yaw direction zero is made as described above is shown in FIG. 13B.

Figure 12A:
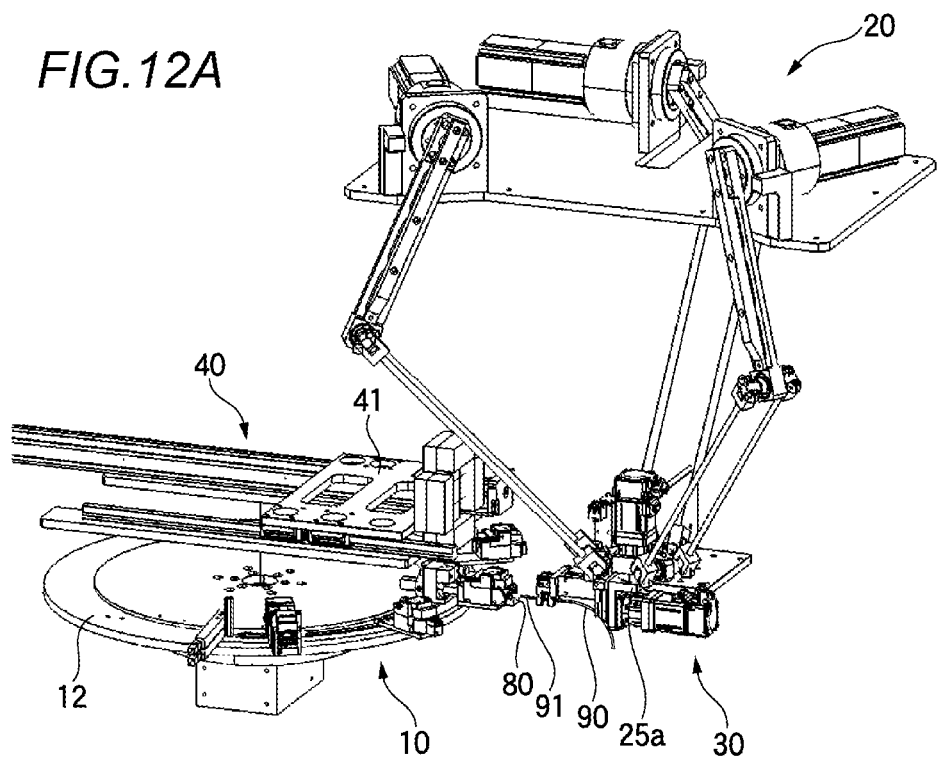
FIG. 12A is a perspective view showing a step of the terminal insertion processing by the terminal insertion device of the embodiment of the present invention.
Figure 12B:
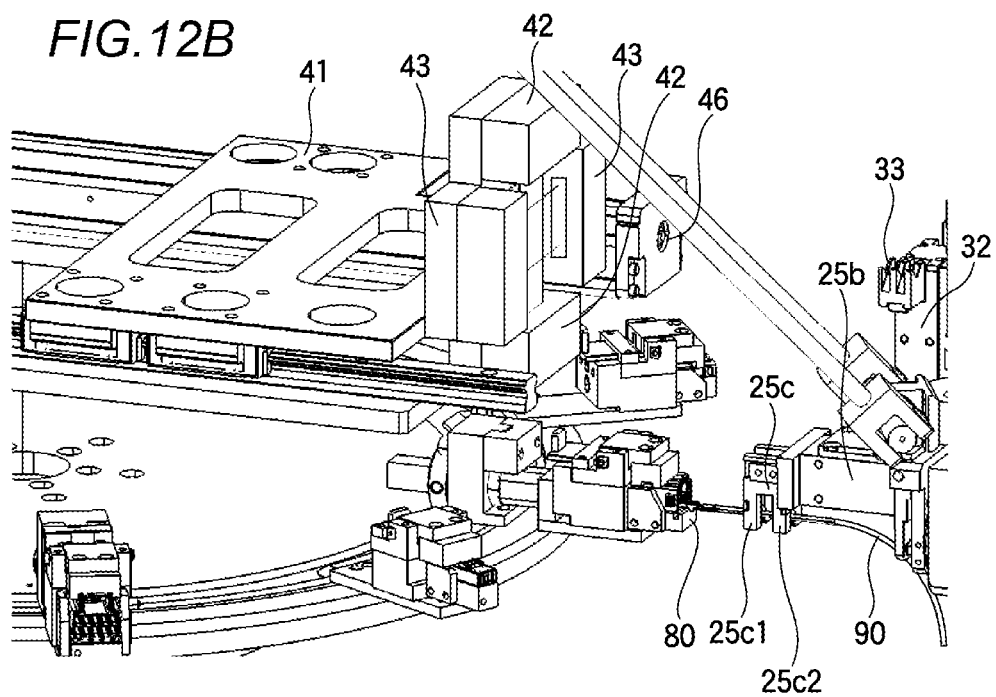
FIG. 12B is an enlarged view of a relevant part of FIG. 12A.
Figure 18:
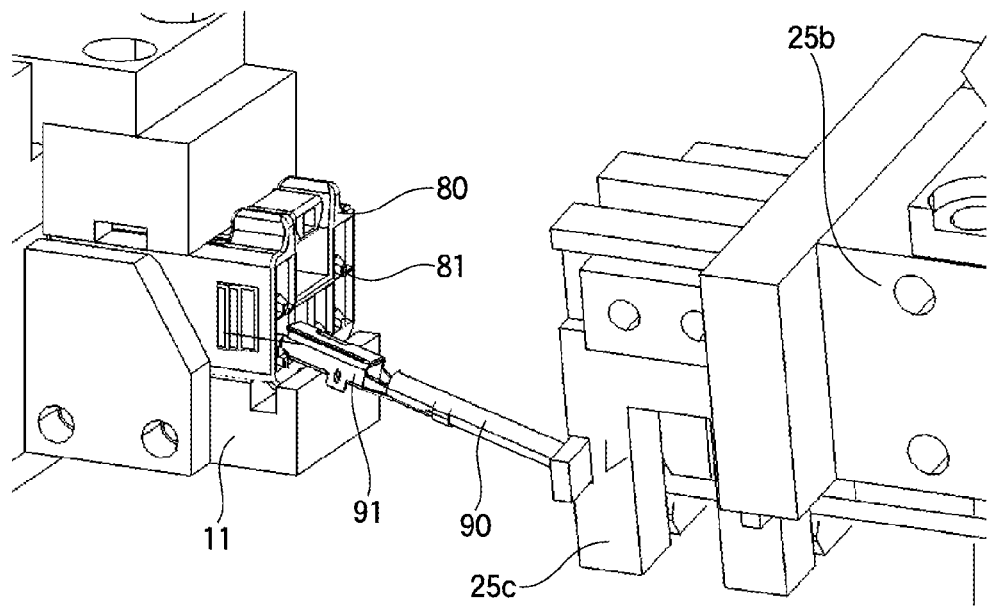
FIG. 18 is a perspective view showing a condition where the leading end of the terminal is moved to a position immediately in front of the breadth reference position of the cavity into which the terminal is to be inserted.

At step S34 of FIG. 16, the parallel joint mechanism 20 moves the position while the hand member 25 remains grasping the electric wire 90, and moves the electric wire 90 to the position of one connector housing 80 as shown in FIG. 12A and FIG. 12B. More strictly, the leading end of the terminal 91 is conveyed so as to move to a position immediately in front of the breadth reference position of the cavity 81 into which the terminal 91 is to be inserted. The condition where the leading end of the terminal 91 is moved to the position immediately in front of the breadth reference position of the cavity 81 into which it is to inserted is shown in FIG. 18. In the condition at step S34, the shift of the leading end of the terminal 91 in the Z axis direction (that is, the rotation angle $\theta_2$ in the pitch direction) is not zero, either.

At the next step S35, the terminal 91 is further moved in the Y axis direction from the position at S34, and the terminal 91 is inserted to a primary insertion position of the corresponding cavity 81. This primary insertion position is a position where the leading end of the terminal 91 surely abuts on the connector housing 80 in the neighborhood of the entrance of the cavity 81 and a position where the terminal 91 is not inserted all the way into the cavity 81 yet.

At the next step S36, with the condition at S35 unchanged, the hand member 25 grasping the electric wire 90 moves to a position where this compensation is not made, by an amount corresponding to the above-mentioned compensation amount (X, Z, a). That is, with the position of the leading end of the terminal 91 remaining fixed by being hooked on the opening of the cavity 81, the hand base 25a grasping the electric wire 90 moves in the Z axis direction to make the compensation amount Z zero, and the electric wire grasping main unit 25b rotated in the yaw direction is returned to the condition where the rotation angle is zero. At this time, since the part of the electric wire 90 grasped by the electric wire chuck 25c moves with the leading end of the terminal 91 being fixed to the cavity 81, an external force is applied to the electric wire 90 so that the inclination is rectified. By this rectification, the part of the electric wire 90 from the grasped position to the leading end of the terminal 91 becomes straightly extended in the insertion direction along the Y axis.

At step S37, the terminal 91 is further moved in the Y axis direction from the condition at S36, and the terminal 91 is inserted to a secondary insertion position of the corresponding cavity 81. This secondary insertion position corresponds to a condition where the terminal 91 is inserted by a distance sufficient for the terminal 91 to be engaged with the lance of the cavity 81.

<Example of the Operation by the Electric Wire Inclination Compensation Control>

FIG. 19A to FIG. 19D are condition transition views showing a concrete example of the condition transition, within a horizontal plane, of the terminal and its surroundings when the electric wire inclination rectification control is executed. Referring to FIG. 19A to FIG. 19D, the above-described processing of steps S34, S35, S36 and S37 will be described in more detail.

That is, by executing steps S34, S35, S36 and S37 shown in FIG. 16, the following conditions shown in FIG. 19 are brought about: FIG. 19A the condition of the position prior to the terminal insertion; FIG. 19B the condition of the primary insertion position; FIG. 19C the condition of a primary insertion home position; and FIG. 19D the condition of the secondary insertion position.

Figure 19A:
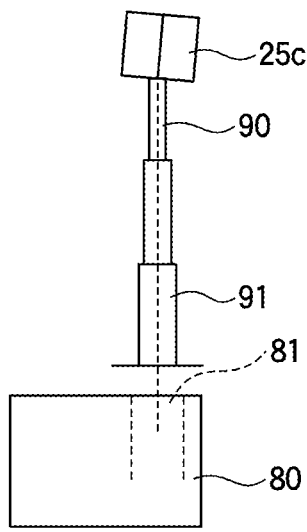
FIG. 19A to FIG. 19D are condition transition views showing a concrete example of the condition transition, within a horizontal plane, of the terminal and its surroundings when the electric wire inclination rectification control is executed.

Under the condition (1) of the position prior to the terminal insertion, as shown in FIG. 19A, the leading end of the terminal 91 is opposed to the connector housing 80, and is present in the position immediately in front of the breadth reference position of the cavity 81. At this time, the leading end of the terminal 91 of the electric wire 90 under a condition where the position compensation to make the rotation angle in the yaw direction zero is made at S33 described above is aligned to the breadth reference position.

Figure 19B:
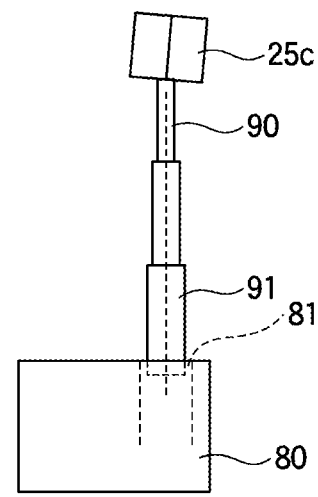

Under the condition (2) of the primary insertion position, as shown in FIG. 19B, only the leading end of the terminal 91 abuts on the breadth of the cavity 81 of the connector housing 80. Here, the terminal 91 can be inserted more deeply into the cavity 81. However, when the electric wire 90 is inclined in the pitch direction, since the direction of the insertion force does not coincide with the Y axis, an excessive force in an oblique direction is applied to the electric wire 90, so that there is a possibility that the terminal 91 buckles before sufficiently inserted. When the terminal 91 buckles, it is impossible to insert the terminal 91 any further, so that the insertion fails.

Figure 19C:
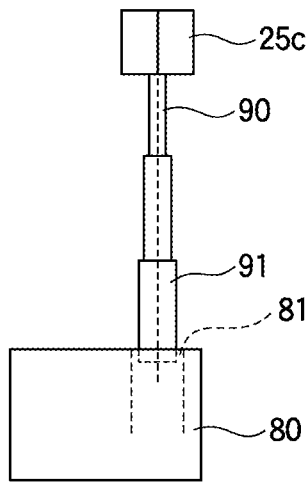

Under the condition (3) of the primary insertion home position, as shown in FIG. 19C, the position of the electric wire chuck 25c moves in a direction that cancels the shift Z of the leading end of the terminal 91 while the leading end of the terminal 91 remains abutting on the breadth of the cavity 81. At the same time, the electric wire grasping main unit 25b rotated in the yaw direction is returned to the condition where the rotation angle is zero. Thereby, an external force is applied to the electric wire 90 between the leading end of the terminal 91 and the part of the electric wire 90 grasped by the electric wire chuck 25c. By this external force, the electric wire 90 inclined in the yaw direction and in the pitch direction is rectified so as to be parallel to the Y axis. That is, under the condition (3) of the primary insertion home position, the electric wire 90 becomes straightly extended along the Y axis from the position of the electric wire chuck 25c to the leading end of the terminal 91.

Figure 19D:
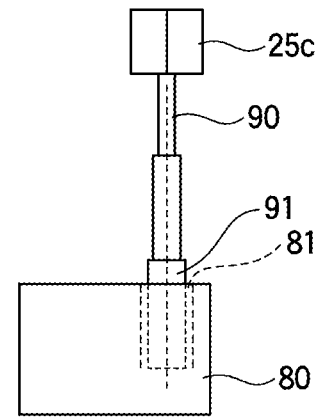

Under the condition (4) of the secondary insertion position, as shown in FIG. 19D, the terminal 91 is inserted to a degree enough to be engaged with the lance of the cavity 81 of the connector housing 80.

At step S33, the shift Z of the leading end of the terminal 91 in the Z axis direction (that is, the rotation angle $\theta_2$ in the pitch direction) is not made zero on purpose. This is because in inserting the terminal 91 into the connector housing 80 as in FIG. 12B, when the rotation angle $\theta_2$ of the electric wire 90 in the pitch direction is not zero, the area of the leading end of the terminal 91 when the terminal 91 is viewed from the cavity opening is reduced and this works favorably to the insertion. Therefore, at step S33 of FIG. 16, the angle "a" of the compensation amount by which compensation is made is limited only to the angle ($\theta_3$) in the yaw direction. Needless to say, at step S33, the electric wire 90 may be revolved in the pitch direction in order to compensate the rotation angle $\theta_2$ in the pitch direction to zero based on the compensation amount (X, Y, a) obtained at S32. In this case, the movement of the hand base 25a in the Z axis direction at step S36 is unnecessary, whereas the processing of returning the electric wire grasping main unit 25b rotated in the pitch direction to the condition where the rotation angle is zero is newly necessitated.

[Workings and Effects of the Terminal Insertion Device of the Present Invention]

By the above-described terminal insertion device of the embodiment of the present invention, the following workings and effects are obtained:

In the terminal insertion device of the embodiment of the present invention, a plurality of connector housings 80 are circularly arranged on the stationary disk 10. For this reason, in the terminal insertion device of the embodiment of the present invention, unlike in the conventional terminal insertion device, it is unnecessary to secure a space largely opened in the width direction to arrange a plurality of connector housings in a row, and it is necessary to secure only a space of a width enough to accommodate the stationary disk 10. For this reason, the above-described structure of the stationary disk 10 contributes to reduction in the size of the terminal insertion device.

The effect of reducing the size of the terminal insertion device is realized by the cooperation between the stationary disk 10 and the parallel joint mechanism 20. By only applying the circular stationary disk 10 of the present invention to the conventional terminal insertion device, the device on the side where the terminal is inserted into the connector housing cannot handle the circular stationary disk 10, which only makes it difficult to insert the terminal into the connector housing. It is added that to solve this difficulty, the parallel joint mechanism 20 is used that is capable of freely moving and revolving with six degrees of freedom within its movement range although the movement range is small. Further, in addition to this, the size of the parallel joint mechanism 20 itself can be small compared with the device on the side where the terminal is grasped in the conventional terminal insertion device. For this reason, the overall size of the terminal insertion device can be further reduced in part because of the excellent compatibility between the stationary disk 10 and the parallel joint mechanism 20, that is, the similarity between the locus of the rotation of the connector housings arranged on the stationary disk 10 and the shape of the movement range of the parallel joint mechanism 20.

Moreover, the terminal insertion device of the embodiment of the present invention has a structure in which the stationary disk 10 rotates so that the next connector housing 80 into which the terminal 91 is to be inserted approaches the electric wire 90 grasped by the parallel joint mechanism 20. For this reason, the movement of the parallel joint mechanism 20 can be minimized, so that the work efficiency of the parallel joint mechanism 20 can be improved.

Moreover, the terminal insertion device of the embodiment of the present invention has a structure in which the parallel joint mechanism 20 does not grasp the terminal and grasps only the electric wire. For this reason, it is unnecessary to provide the electric wire grasping main unit 25b of the parallel joint mechanism 20 with a chuck for grasping the terminal. This leads to reduction in the weight of the electric wire grasping main unit 25b, which leads to reduction in the weight of the hand member 25. As a consequence, improvement in the operation speed of the parallel joint mechanism 20 and reduction in cycle time can be realized, so that the work efficiency of the parallel joint mechanism 20 can be improved.

Moreover, in the terminal insertion device of the embodiment of the present invention, the measurement of the leading end of the terminal 91 is optically performed by using the X measurement sensor 42 and the Z measurement sensor 43. For this reason, it is possible to instantaneously detect the widths in the X direction and the Z direction and X and Z coordinates of the terminal 91 to detect the position of the terminal 91. Further, since the detection accuracy is high, the rotation angle of the electric wire grasping main unit 25b in the roll direction and the rotation angle in the pitch direction and rotation angle in the yaw direction of the electric wire grasping main unit 25b can be accurately measured. As a consequence, reduction in cycle time and reduction in terminal insertion errors can be realized, so that the work efficiency improves. Moreover, measurement is started with the entrance of the leading end of the terminal 91 into the detection area of the X measurement sensor 42 and the Z measurement sensor 43 as the trigger. Along with the highness of reactivity of the X measurement sensor 42 and the Z measurement sensor 43 and the easiness of the terminal measurement processing, the time required for the terminal insertion processing by the parallel joint mechanism 20 can be reduced.

Moreover, in the terminal insertion device of the embodiment of the present invention, even if the electric wire 90 has a slight curl, the terminal 91 can be inserted into the connector housing 80 with the curl being remained. For this reason, a step for suppressing variations in accuracy among the components such as rectifying the curl of the electric wire 90 is unnecessary. As a consequence, the work efficiency improves.

Moreover, in the terminal insertion device of the embodiment of the present invention, after the terminal 91 is inserted into the connector housing 80, the electric wire 90 is pulled in the direction opposite to the terminal insertion direction to thereby determine whether the terminal 91 is normally inserted or not. For the terminal insertion normal/not normal determination by this operation, it is necessary only to provide the electric wire grasping main unit 25b with the pressure sensor 25g, so that reduction in the weight of the electric wire grasping main unit 25b due to the reduction in the number of components, and reduction in cost can be achieved. The reduction in the weight of the electric wire grasping main unit 25b leads to improvement in the operation speed of the parallel joint mechanism 20 and reduction in cycle time.

Moreover, in the terminal insertion device of the embodiment of the present invention, based on the information on the contour position of the terminal 91 measured by the terminal measurement sensor 40, the inclination angle θ of the terminal 91 in the roll direction is calculated at S14 and this is compensated by the processing of S15 to S23. Further, the rotation operation can be performed three-dimensionally (X, Z, a) by the parallel joint mechanism 20. For this reason, the terminal 91 can be inserted while the orientation of the terminal 91 is aligned to the shape of the cavity 81 without the electric wire 90 being grasped, rotated or re-caught by the conveyance chuck 33. Moreover, since re-catching is unnecessary, the occurrence of a position shift due to re-catching can be prevented, and the cycle time can be improved. By compensating the inclination angle θ of the terminal 91 in the roll direction, the orientation of the terminal 91 can be accurately aligned to the shape of the opening of the cavity 81, so that insertion failure does not readily occur.

Moreover, in the terminal insertion device of the embodiment of the present invention, when the angle θ in the roll direction is calculated at S14, since the length "c" of the diagonal line of the rectangle corresponding to the cross-sectional shape of the terminal 91 shown in FIG. 14B and the width dimension "X" obtained by measurement are used to perform the calculation, the angle θ can be instantaneously obtained, and the angle θ in the roll direction can be grasped without the terminal measurement sensor 40 being rotated. Therefore, even when subtle vibrations occurs on the terminal 91 due to a movement or the like, the angle θ can be obtained in a short time, and the influence is not readily exerted by external perturbations such as vibrations of the equipment. Moreover, since the angle θ in the roll direction is obtained by calculation, the compensation angle is instantaneously found, it is possible to perform measurement while moving the terminal 91 and the electric wire 90, and the threshold value used for the OK/NG determination can be clarified.

Moreover, in the terminal insertion device of the embodiment of the present invention, the electric wire 90 is rectified so as to be parallel to the Y axis in the state that the primary insertion home position, and thereafter, the terminal is inserted into the cavity to the secondary insertion position. For this reason, insertion failure due to buckling of the terminal can be suppressed.

[Application of the Terminal Insertion Device of the Present Invention]

In the terminal insertion device of the above-described embodiment of the present invention, a plurality of connector housings 80 are circularly arranged on the stationary disk 10. The terminal insertion device of the present invention is not limited to a structure in which the positional relationship where a plurality of connector housings 80 are arranged is circular as a whole. All the shapes where a plurality of connector housings 80 are annular when they are viewed as a whole are included. Additionally, it is unnecessary that the positional relationship where a plurality of connector housings 80 are arranged be annular as a whole. If a first connector housing, a second connector housing and a third connector housing of a plurality of connector housings are arranged in such a manner that the direction of arrangement of the first connector housing and the second connector housing and the direction of arrangement of the second connector housing and the third connector housing intersect each other, the effect of reducing the size of the terminal insertion device can be fulfilled. Additionally, even in the mode where a plurality of connector housings 80 are arranged in a row, what are described in [Description of the processing procedure of the characteristic control] shown above may be applied.

Moreover, it is unnecessary that the adjoining connector housings of a plurality of connector housing 80 be arranged at predetermined intervals. The adjoining connector housings 80 may be arranged at arbitrary intervals.

Moreover, in the terminal insertion device of the above-described embodiment of the present invention, the revolution in the roll direction, in the pitch direction and in the yaw direction by the parallel joint mechanism 20 is driven by the second motor 25f and the third motor 25d provided on the hand base 25a. The member where the second motor 25f and the third motor 25d are provided is not limited to the hand base 25a. A structure may be adopted in which a motor corresponding to the second motor 25f and the third motor 25d is provided on the base 21 and the rotation of the motor is transmitted to the hand base 25a through a telescopic shaft and a universal joint to realize the revolution of the hand base 25a in the roll direction, in the pitch direction and in the yaw direction.

Moreover, in the terminal insertion device of the above-described embodiment of the present invention, the series of operations and arrangement of the stationary disk 10, the parallel joint mechanism 20, the electric wire conveyer 30 and the terminal measurement sensor 40 are merely an example. For example, the terminal measurement on the electric wire 90 may also be performed also by a series of operations and arrangement such that the terminal measurement sensor 40 is mounted on the mobile unit 32, the electric wire 90 is supplied to the conveyance chuck 33, at the point of time when the conveyance chuck 33 is closed, the terminal measurement sensor 40 moves forward in the negative direction of the Y axis and simultaneously with this, the mobile unit 32 moves to a predetermined position below the parallel joint mechanism 20, and the parallel joint mechanism 20 moves down from the predetermined position to grasp the electric wire 90.

Figure 20A:
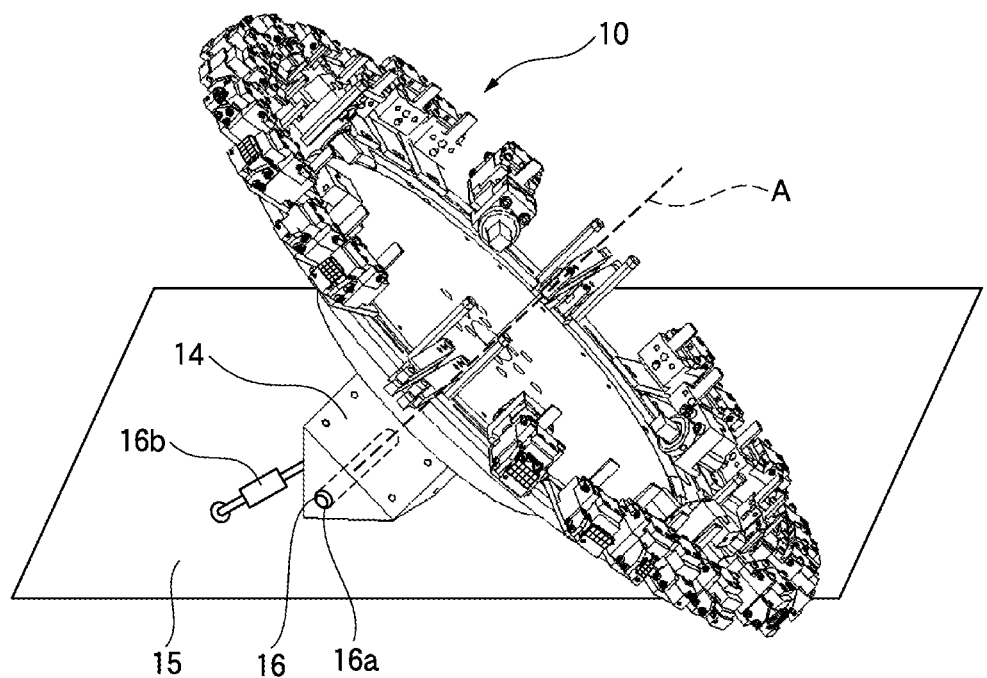
FIG. 20A and FIG. 20B are views showing applications of the stationary disk in the terminal insertion device of the embodiment of the present invention.
Figure 20B:
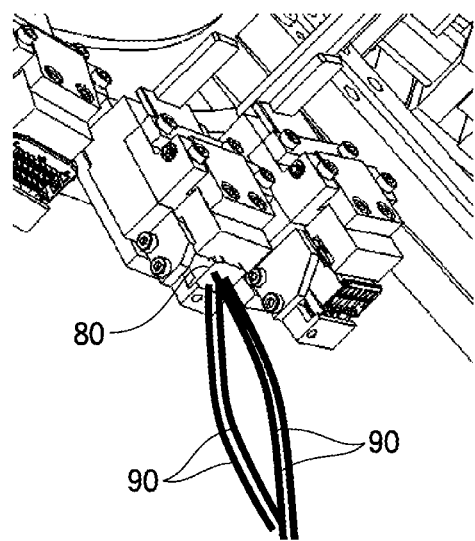

Moreover, in the terminal insertion device of the above-described embodiment of the present invention, the motor member 14 of the stationary disk 10 is supported on the flat surface of the housing support platform (not shown) in such a manner that the rotation shaft thereof is vertical to the flat surface. The angle of the rotation shaft to the flat surface is not limited to vertical. It may be determined as appropriate according to the shape of the stationary disk 10. Moreover, the angle of the rotation shaft to the flat surface may be variable. A mode where the angle of the rotation shaft to the flat surface is variable will be described with reference to FIG. 20A and FIG. 20B. FIG. 20A and FIG. 20B are views showing applications of the stationary disk in the terminal insertion device of the embodiment of the present invention; FIG. 20A is a perspective view of the stationary disk and FIG. 20B is an enlarged view of a relevant part of FIG. 20A. As shown in FIG. 20A, the stationary disk 10 is attached to a flat surface of a housing support platform 15 through a mount 16 that adjusts the angle of the rotation shaft A to the flat surface. The mount 16 is provided with a shaft 16a and an air cylinder 16b, and the rotation angle to the shaft 16a can be adjusted by the air cylinder 16b. Thereby, the angle of the rotation shaft A of the motor member 14 to the flat surface can be adjusted. In such a stationary disk 10, as shown in FIG. 20B, when the connector housing 80 having undergone terminal insertion processing is fixed to the stationary disk 10, by the stationary disk 10 being inclined so that the outer edge thereof is lowered toward the connector housing 80, the electric wire 90 situated in the neighborhood of the connector housing 80 comes to have a more linear shape, in order words, comes to have a shape where hanging down or springback of the electric wire is suppressed. For this reason, when the connector housing 80 fixed to the stationary disk 10 is rotated, the electric wire extending from the connector housing 80 can be restrained from coming into contact with another electric wire to damage the electric wire or being entangled with another electric wire.

Figure 21:
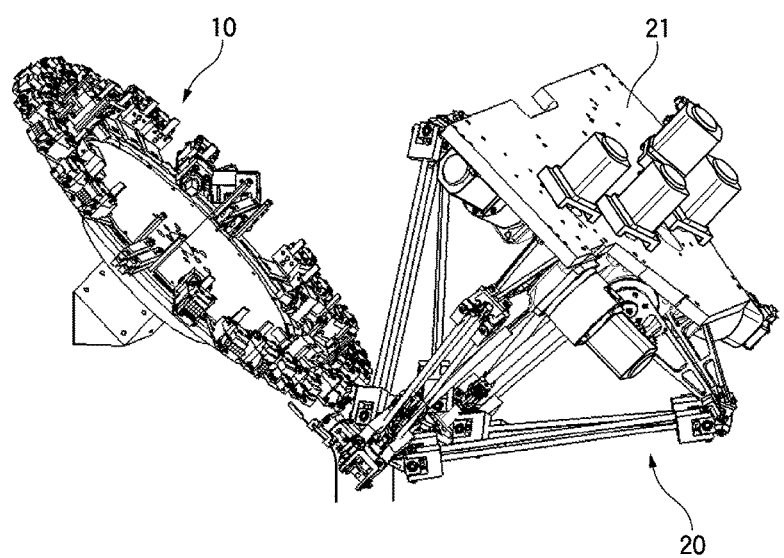
FIG. 21 is a perspective view showing an application of the parallel joint mechanism 20 in the terminal insertion device of the embodiment of the present invention.

Moreover, when the parallel joint mechanism 20 performs terminal insertion processing on the stationary disk 10 described with reference to FIG. 20A and FIG. 20B where the angle of the rotation shaft to the flat surface is variable, it is necessary to incline the base 21 of the parallel joint mechanism 20 so as to be parallel to the stationary disk 10. FIG. 21 is a perspective view showing an application of the parallel joint mechanism 20 in the terminal insertion device of the embodiment of the present invention. By making the inclination of the base 21 of the parallel joint mechanism 20 parallel to the stationary disk 10 as shown in FIG. 21, the orientation of the cavity 81 of the connector housing 80 and the direction where the parallel joint mechanism 20 inserts the terminal 91 coincide with each other. For this reason, even with the stationary disk 10 inclined with respect to the horizontal plane, the parallel joint mechanism 20 can insert the terminal 91 into the connector housing 80 of the stationary disk 10.

Now, features of the terminal insertion device and the terminal insertion method of the above-described embodiment of the present invention are briefly summarized and listed in the following [1] to [12]:

[1] A terminal insertion device that inserts a terminal (91) into a connector housing (80), comprising:
a stationary disk (10) on which a plurality of connector housings are arranged;
a parallel joint mechanism (20) which grasps an electric wire (90) which is connected to the terminal at a leading end, conveys the electric wire toward any one of the connector housings arranged on the stationary disk, and inserts the terminal into a cavity of the connector housing;
a biaxial sensor portion (40) capable of measuring at least a contour position of the terminal with respect to each of a direction of a first axis (X) substantially orthogonal to an insertion direction of the terminal and a direction of a second axis (Z) orthogonal to the first axis;
a roll angle calculation portion (110) which calculates a roll angle ($\theta$) with respect to a reference condition in a direction circling around an axis in the insertion direction of the terminal based on a diagonal dimension (c) in a rectangular cross-sectional shape of a leading end portion of the terminal and a width dimension ("X") of the terminal obtained by the measurement using the biaxial sensor portion; and
a roll angle compensation control portion (120) that controls the parallel joint mechanism to compensate an inclination of the terminal corresponding to the roll angle before the terminal is inserted into the cavity.

[2] The terminal insertion device according to [1], further comprising:
an electric wire inclination compensation control portion (130) that controls the parallel joint mechanism so as to measure positional coordinates of the leading end portion of the terminal by using the biaxial sensor portion (S31), detects an inclination of the electric wire in a yaw direction and a pitch direction based on a difference of the positional coordinates from reference coordinates (S32) and compensates the position of the leading end portion of the terminal according to the inclination before the terminal is inserted into the cavity (S33).

[3] The terminal insertion device according to [2], further comprising:
an electric wire inclination rectification control portion (140) that, after the roll angle compensation control portion completes the compensation of the inclination of the terminal and the electric wire inclination compensation control portion completes the compensation of the position of the leading end portion of the terminal, moves the terminal to a primary insertion position where the leading end portion of the terminal abuts on an entrance of the cavity into which the terminal is to be inserted (S35), thereafter, moves a position where the electric wire is grasped, so as to rectify the inclination of the electric wire detected by the electric wire inclination compensation control portion (S36), and then, inserts the terminal into the cavity to a secondary insertion position behind the primary insertion position (S37).

[4] The terminal insertion device according to any one of [1] to [3], wherein
after executing the compensation of the inclination of the terminal in a specific rotation direction in a state that the rotation direction of the roll angle is unknown (S12, S15), the roll angle compensation control portion (120) again measures the diagonal dimension of the terminal by using the biaxial sensor portion (S16), and when it is detected from the measurement result that the roll angle has increased (S18), compensates the inclination of the terminal with respect to a direction opposite to the specific rotation direction (S19, S15).

[5] The terminal insertion device according to any one of [1] to [4], wherein
the biaxial sensor portion is supported by a movable mechanism (41) that is movable in directions approaching and separating from the terminal along an axis (Y) the same as the insertion direction of the terminal into the cavity.

[6] The terminal insertion device according to any of [1] to [5], wherein
the parallel joint mechanism grasps a part of the electric wire (90) in a state that the terminal (91) is released.

[7] A terminal insertion method of inserting a terminal (91) into a connector housing (80) by a parallel joint mechanism (20), comprising:
a step of grasping an electric wire which is connected to the terminal at a leading end;
a step of conveying the electric wire toward any one of a plurality of connector housings arranged on a stationary disk;
a step of measuring at least a contour position of the terminal with respect to each of a direction of a first axis substantially orthogonal to an insertion direction of the terminal and a direction of a second axis orthogonal to the first axis (S11, S13);
a step of calculating a roll angle with respect to a reference condition in a direction circling around an axis in the insertion direction of the terminal based on a diagonal dimension in a rectangular cross-sectional shape of a leading end portion of the terminal and a width dimension of the terminal obtained by the measurement (S14);
a step of controlling the parallel joint mechanism to compensate an inclination of the terminal corresponding to the roll angle before the terminal is inserted into the cavity (S15 to S23); and
a step of inserting the terminal into the cavity in the connector housing (S34 to S37).

[8] The terminal insertion method according to [7], further comprising:
a step of measuring positional coordinates of the leading end portion of the terminal (S31);
a step of detecting an inclination of the electric wire in a pitch direction and a yaw direction based on a difference of the positional coordinates from reference coordinates (S32); and
a step of controlling the parallel joint mechanism so as to compensate the position of the leading end portion of the terminal according to the inclination before the terminal is inserted into the cavity (S33).

[9] The terminal insertion method according to [8], further comprising:
a step of, after the compensation of the inclination of the terminal is completed and the compensation of the position of the leading end portion of the terminal is completed, moving the terminal to a primary insertion position where the leading end portion of the terminal abuts on an entrance of the cavity into which the terminal is to be inserted (S35);
a step of moving a position where the electric wire is grasped, so as to rectify the inclination of the electric wire (S36); and
a step of inserting the terminal into the cavity to a secondary insertion position behind the primary insertion position (S37).

[10] The terminal insertion method according to any one of [7] to [9], further comprising:
a step of compensating the inclination of the terminal in a specific rotation direction in a state that the rotation direction of the roll angle is unknown (C11, C21); and
a step of again measuring the diagonal dimension of the terminal and when it is detected from the measurement result that the roll angle has increased, compensating the inclination of the terminal with respect to a direction opposite to the specific rotation direction (C12, C22).

[11] The terminal insertion method according to any one of [7] to [10], wherein
in the step of measuring the contour position of the terminal (91), the biaxial sensor portion approaches or separates from the terminal (91) along an axis the same as the insertion direction of the terminal (91) into the cavity (81).

[12] The terminal insertion method according to any one of [7] to [11], wherein
a part of the electric wire (90) is grasped by the parallel joint mechanism (20) in a state that the terminal (91) is released.

While the present invention has been described in detail with reference to a specific embodiment, it is obvious to one of ordinary skill in the art that various changes and modifications may be added without departing from the spirit and scope of the present invention.

The present application is based upon Japanese Patent Application (Patent Application No. 2013-100760) filed on May 10, 2013, the contents of which are incorporated herein by reference.

INDUSTRIAL APPLICABILITY

According to the terminal insertion device and the terminal insertion method of the present invention, terminal insertion failure does not readily occur, and the required time (cycle time) for the repetitively performed insertion work can be reduced. The present invention producing this effect is useful for the terminal insertion device and the terminal insertion method that insert a terminal into a connector housing.

DESCRIPTION OF REFERENCE NUMERALS AND SIGNS

10 Stationary disk
11 Housing cradle
12 Rail member
13 Disk member
14 Motor member
15 Housing support platform
20 Parallel joint mechanism
21 Base
22a, 22b, 22c First motor
23a, 23b, 23c Arm
24a, 24b, 24c Link
25 Hand member
25f Second motor
30 Electric wire conveyer
31 Conveyance rail
32 Mobile unit
33 Conveyance chuck
34 Frame
35 Air chuck main unit
40 Terminal measurement sensor
41 Sensor mount
42 X measurement sensor
43 Z measurement sensor
44 Sensor mount rail
45 Slider
46 Drive source
70 Control device
80 Connector housing
81 Cavity
90 Electric wire
91 Terminal 110 Roll angle calculation portion
120 Roll angle compensation control portion
130 Electric wire inclination compensation control portion
140 Electric wire inclination rectification control portion

What is claimed is:

1. A terminal insertion method of inserting a terminal into a connector housing by a parallel joint mechanism, the parallel joint mechanism including plural arms connected to a hand member with plural motors and a grasping mechanism, wherein the insertion direction of the terminal into the connector housing, an x-axis perpendicular to the y-axis, and a z-axis perpendicular to both the y-axis and the x-axis, and the plural motors allow for the grasping mechanism to be rotated about the y-axis defining a roll direction, the x-axis defining a pitch direction, and the z-axis defining a yaw direction, the terminal insertion method comprising:

grasping an electric wire which is connected to the terminal at a leading end of the electric wire using the grasping mechanism;

conveying the electric wire grasped by the grasping mechanism toward any one of a plurality of connector housings arranged on a stationary disk using the parallel joint mechanism;

measuring a contour position of the terminal, the contour position of the terminal including widths of the terminal measured with respect to the x-axis and the z-axis;

calculating a roll angle of the terminal in the roll direction based on a diagonal dimension of the terminal and the contour position of the terminal obtained by the measurement;

controlling the parallel joint mechanism to compensate an inclination of the terminal corresponding to the roll angle before the terminal is inserted into a cavity in the connector housing; and inserting the terminal into the cavity in the connector housing.

2. The terminal insertion method according to claim 1, further comprising:

measuring positional coordinates of the terminal;
calculating an inclination of the terminal in the pitch direction and the yaw direction; and
controlling the parallel joint mechanism so as to compensate the positional coordinates of the terminal and the inclination of the terminal in the pitch direction and the yaw direction before the terminal is inserted into the cavity.

3. The terminal insertion method according to claim 2, further comprising:

after the compensation of the inclination of the terminal corresponding to the roll angle and the inclination of the terminal in the pitch direction and the yaw direction is completed and the compensation of the positional coordinates of the terminal is completed, moving the terminal to a primary insertion position where a leading end portion of the terminal abuts on an entrance of the cavity into which the terminal is to be inserted;

moving a position where the electric wire is grasped by the grasping mechanism, so as to rectify the inclination of the electric wire in the pitch direction; and inserting the terminal into the cavity to a secondary insertion position behind the primary insertion position.

4. The terminal insertion method according to claim 1, further comprising:

compensating the inclination of the terminal corresponding to the roll angle in a specific rotation direction; and measuring again the contour position of the terminal and when it is calculated from the measurement result that the roll angle has increased, compensating the inclination of the terminal with respect to a direction opposite to the specific rotation direction.

5. The terminal insertion method according to claim 1, wherein in the measuring of the contour position of the terminal, a biaxial sensor portion approaches or separates from the terminal along the y-axis.

6. The terminal insertion method according to claim 1, wherein a part of the electric wire is grasped by a grasping unit of the parallel joint mechanism in a state that the terminal is released.

* * * * *